US011638155B2

(12) United States Patent
Rajput et al.

(10) Patent No.: US 11,638,155 B2
(45) Date of Patent: Apr. 25, 2023

(54) METHODS, SYSTEMS, AND COMPUTER READABLE MEDIA FOR PROTECTING AGAINST MASS NETWORK FUNCTION (NF) DEREGISTRATION ATTACKS

(71) Applicant: Oracle International Corporation, Redwood Shores, CA (US)

(72) Inventors: Jay Rajput, Bangalore (IN); Virendra Singh, Bangalore (IN); Amarnath Jayaramachar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 20 days.

(21) Appl. No.: 17/314,329

(22) Filed: May 7, 2021

(65) Prior Publication Data

US 2022/0360991 A1   Nov. 10, 2022

(51) Int. Cl.
*H04W 48/02* (2009.01)
*H04W 12/122* (2021.01)

(52) U.S. Cl.
CPC .................... *H04W 12/122* (2021.01)

(58) Field of Classification Search
CPC .................................................... H04W 12/12
See application file for complete search history.

(56) References Cited

U.S. PATENT DOCUMENTS

| | | |
|---|---|---|
| 1,872,957 A | 8/1931 | Wesson et al. |
| 5,835,087 A | 11/1998 | Herz et al. |
| 6,185,612 B1 | 2/2001 | Jensen et al. |
| 6,298,383 B1 | 10/2001 | Gutman et al. |

(Continued)

FOREIGN PATENT DOCUMENTS

| | | |
|---|---|---|
| CN | 1964316 | 5/2007 |
| CN | 103039049 B | 8/2016 |

(Continued)

OTHER PUBLICATIONS

Notification of Transmittal of the International Search Report and the Written Opinion of the International Searching Authority, or the Declaration for International Application No. PCT/US2022/026418 (dated Jul. 8, 2022).

(Continued)

*Primary Examiner* — Michael T Vu
(74) *Attorney, Agent, or Firm* — Jenkins, Wilson, Taylor & Hunt, P.A.

(57) ABSTRACT

A method for protecting against mass NF deregistration attacks can be performed at an NRF or SCP. The method includes receiving an NFDeregister request for deregistering an NF. The method further includes classifying the NFDeregister request as suspect based on application of suspect NFDeregister request classification rules. The method further includes in response to classifying the NFDeregister request as suspect, queueing the NFDeregister request. The method further includes receiving an NF heart-beat message concerning the NF. The method further includes determining that the NF heart-beat message is received within an NF heart-beat time interval for the NF. The method further includes in response to determining that the NF heart-beat message is received within the NF heart-beat time interval for the NF, preventing processing of the NF Deregister request and blacklisting a sender of the NFDeregister request.

19 Claims, 16 Drawing Sheets

(56) References Cited

U.S. PATENT DOCUMENTS

| | | |
|---|---|---|
| 7,266,837 B2 | 9/2007 | Monjas-Llorente et al. |
| 8,127,016 B2 | 2/2012 | Westman et al. |
| 8,171,032 B2 | 5/2012 | Herz |
| 8,218,459 B1 | 7/2012 | Stucker |
| 8,218,490 B2 | 7/2012 | Rydnell et al. |
| 8,626,157 B2 | 1/2014 | Nas et al. |
| 8,929,360 B2 | 1/2015 | Agarwal et al. |
| 9,094,819 B2 | 7/2015 | McCann et al. |
| 9,253,163 B2 | 2/2016 | Donovan |
| 9,967,148 B2 | 5/2018 | Goyal et al. |
| 10,033,736 B2 | 7/2018 | McCann |
| 10,547,613 B1 | 1/2020 | Roths et al. |
| 10,609,154 B2 * | 3/2020 | Talebi Fard .......... H04W 48/18 |
| 10,833,938 B1 | 11/2020 | Rajput et al. |
| 10,834,571 B1 | 11/2020 | Yau et al. |
| 11,558,737 B2 | 1/2023 | Rajput et al. |
| 2003/0227894 A1 | 12/2003 | Wang et al. |
| 2005/0235000 A1 | 10/2005 | Keil |
| 2006/0078119 A1 | 4/2006 | Jee et al. |
| 2006/0155871 A1 | 7/2006 | Ilkka et al. |
| 2006/0259759 A1 | 11/2006 | Maino et al. |
| 2007/0019616 A1 | 1/2007 | Rantapuska et al. |
| 2007/0250642 A1 | 10/2007 | Thubert et al. |
| 2007/0297419 A1 | 12/2007 | Askerup et al. |
| 2008/0010669 A1 | 1/2008 | Aittola et al. |
| 2008/0039104 A1 | 2/2008 | Gu et al. |
| 2009/0080440 A1 | 3/2009 | Balyan et al. |
| 2009/0165017 A1 | 6/2009 | Syed et al. |
| 2009/0232011 A1 | 9/2009 | Li et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0291923 A1 | 11/2010 | Zhou et al. |
| 2011/0165901 A1 | 7/2011 | Baniel et al. |
| 2011/0195710 A1 | 8/2011 | Nas et al. |
| 2011/0302244 A1 | 12/2011 | McCann et al. |
| 2012/0155389 A1 | 6/2012 | McNamee et al. |
| 2012/0157047 A1 | 6/2012 | Chen et al. |
| 2012/0158994 A1 | 6/2012 | McNamee et al. |
| 2012/0226814 A1 | 9/2012 | Stucker |
| 2013/0097418 A1 | 4/2013 | Bhatt et al. |
| 2013/0151845 A1 | 6/2013 | Donovan |
| 2013/0185767 A1 | 7/2013 | Tirupachur Comerica et al. |
| 2013/0290722 A1 | 10/2013 | Kall et al. |
| 2016/0352696 A1 | 12/2016 | Essigmann et al. |
| 2017/0012824 A1 | 1/2017 | Goyal et al. |
| 2017/0214691 A1 | 7/2017 | McCann |
| 2019/0260803 A1 | 8/2019 | Bykampadi et al. |
| 2020/0036754 A1 | 1/2020 | Livanos |
| 2020/0186359 A1 | 6/2020 | Chan et al. |
| 2020/0245139 A1 | 7/2020 | Nakarmi et al. |
| 2021/0083965 A1 | 3/2021 | Taft et al. |
| 2021/0250172 A1 | 8/2021 | Choyi et al. |
| 2021/0288802 A1 | 9/2021 | Muhanna et al. |
| 2021/0385286 A1 | 12/2021 | Wang et al. |
| 2022/0052992 A1 | 2/2022 | Zhang et al. |
| 2022/0124468 A1 | 4/2022 | Lu et al. |
| 2022/0225084 A1 | 7/2022 | Rajput et al. |
| 2022/0345486 A1 | 10/2022 | Rajput et al. |
| 2022/0346188 A1 * | 10/2022 | Malhotra .............. H04W 4/025 |
| 2022/0360447 A1 | 11/2022 | Rajput et al. |
| 2022/0360989 A1 | 11/2022 | Rajput et al. |
| 2022/0361085 A1 | 11/2022 | Rajput et al. |
| 2022/0369204 A1 * | 11/2022 | Jeong .................... H04W 76/30 |

FOREIGN PATENT DOCUMENTS

| | | |
|---|---|---|
| CN | 111163473 A | 5/2020 |
| EP | 1 848 150 A1 | 10/2007 |
| EP | 1 873 980 A1 | 1/2008 |
| EP | 3 588 862 A1 | 1/2020 |
| KR | 10-1506232 | 3/2015 |
| WO | WO 2007/125498 A1 | 11/2007 |
| WO | WO 2011/156274 A2 | 12/2011 |
| WO | WO 2020/053481 A1 | 3/2020 |
| WO | WO 2022/043130 A1 | 3/2022 |
| WO | WO 2022/235373 A1 | 11/2022 |
| WO | WO 2022/235374 A1 | 11/2022 |
| WO | WO 2022/235462 A1 | 11/2022 |

OTHER PUBLICATIONS

Notification of Transmittal of the International Search Report and the Written Opinion of the International Searching Authority, or the Declaration for International Application No. PCT/US2022/026417 (dated Jul. 8, 2022).

Notification of Transmittal of the International Search Report and the Written Opinion of the International Searching Authority, or the Declaration for International Application No. PCT/US2022/023899 (dated Jul. 1, 2022).

Notice of Allowance and Fee(s) Due for U.S. Appl. No. 17/314,300 (dated Jun. 6, 2022).

Non-Final Office Action for U.S. Appl. No. 17/314,382 (dated May 23, 2022).

Non-Final Office Action for U.S. Appl. No. 17/145,143 (dated Mar. 15, 2022).

Notification of Transmittal of the International Search Report and the Written Opinion of the International Searching Authority, or the Declaration for U.S. Patent Application Serial No. PCT/US2021/064102 (dated Apr. 7, 2022).

Ericsson, "New Solution to KI#5: End-to-end integrity protection of HTTP body and method," 3GPP TSG-SA3 Meeting #102Bis-e, pp. 1-3 (Mar. 1-5, 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

Commonly-Assigned, co-pending U.S. Appl. No. 17/145,143 for "Methods, Systems, and Computer Readable Media for Preventing Subscriber Identifier Leakage," (Unpublished, filed Jan. 8, 2021).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).

Nokia et al., "Integrity protection of service request in indirect communication," 3GPP TSG-SA3, Meeting#100e, pp. 1-3 (Aug. 17-28, 2020).

"3rd Generation Partnership Project; Technical Specification Group Services and System Aspects; Security Aspects; Study on security aspects of the 5G Service Based Architecture (SBA) (Release 16)," 3GPP TR 33.855, V16.0.0, pp. 1-131 (Jul. 2020).

"5G; Security architecture and procedures for5G System (3GPP TS 33.501 version 16.6.0 Release 16)," ETSI TS 133 501, V16.6.0, pp. 1-258 (Apr. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

Commonly-assigned, co-pending U.S. Appl. No. 17/314,382 for "Methods, Systems, and Computer Readable Media for Single-Use Authentication Messages," (Unpublished, filed May 7, 2021).

(56) References Cited

OTHER PUBLICATIONS

Commonly-Assigned, co-pending U.S. Appl. No. 17/314,300 for "Methods, Systems, and Computer Readable Media for Hiding Network Function Instance Identifiers," (Unpublished, filed May 7, 2021).

Commonly-Assigned, co-pending U.S. Appl. No. 17/308,972 for "Methods, Systems, and Computer Readable Media for Generating and Using Single-Use Oauth 2.0 Access Tokens for Securing Specific Service-Based Architecture (SBA) Interfaces," (Unpublished, filed May 5, 2021).

Commonly-Assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Corrected Notice of Allowability for U.S. Appl. No. 15/003,647 (dated Jun. 28, 2018).

Communication pursuant to Article 94(3) EPC for European Patent Application Serial No. 11 792 956.2 (dated Apr. 23, 2018).

Notice of Allowance and Fee(s) Due for U.S. Appl. No. 15/003,647 (dated Mar. 7, 2018).

Notice of Allowance and Fee(s) Due for U.S. Appl. No. 14/795,601 (dated Dec. 28, 2017).

Applicant Initiated Interview Summary for U.S. Appl. No. 14/795,601 (dated Nov. 24, 2017).

Non-Final Office Action for U.S. Appl. No. 15/003,647 (dated Oct. 10, 2017).

Non-Final Office Action for U.S. Appl. No. 14/795,601 (dated Aug. 18, 2017).

Notification to grant a Chinese patent for Chinese Patent Application No. ZL201180032307.4 (dated Jun. 23, 2016).

Extended European Search Report for European Application No. 11792956.2 (dated Feb. 8, 2016).

Notification of the Third Office Action for Chinese Application No. 201180032307.4 (dated Jan. 25, 2016).

"RADIUS," https://en.wikipedia.org/wiki/RADIUS#Accounting, pp. 1-17 (Nov. 27, 2015).

Notice of Allowance for U.S. Appl. No. 13/712,481 dated Oct. 20, 2015.

Notice of Allowance for U.S. Appl. No. 13/712,481 dated Sep. 25, 2015.

Notification of the Second Office Action for Chinese Application No. 201180032307.4 (dated Jul. 17, 2015).

Commonly-Assigned, co-pending U.S. Appl. No. 14/795,601 for "Methods, Systems, and Computer Readable Media for Selective Diameter Topology Hiding," (Unpublished, filed Jul. 9, 2015).

Non-Final Office Action for U.S. Appl. No. 13/832,137 (dated Jun. 2, 2015).

Non-Final Office Action for U.S. Appl. No. 13/712,481 (dated Apr. 29, 2015).

Notice of Allowance for U.S. Appl. No. 13/154,119 dated Apr. 16, 2015.

Notice of Allowance and Applicant Initiated Interview Summary for U.S. Appl. No. 13/154,119 dated Mar. 17, 2015.

Advisory Action Before the Filing of an Appeal Brief for U.S. Appl. No. 13/712,481 (dated Mar. 11, 2015).

Email Regarding Decision to Grant for Korean Patent Application No. 2012-7034449 (dated Mar. 2, 2015).

Final Office Action for U.S. Appl. No. 13/712,481 (dated Dec. 3, 2014).

Notification of the First Office Action for Chinese Patent Application No. 201180032307.4 (dated Nov. 4, 2014).

Office Action for Korean Patent Application No. 2012-7034449 (dated Oct. 14, 2014).

Non-Final Office Action for U.S. Appl. No. 13/712,481 (dated May 8, 2014).

Notice of Preliminary Rejection for Korean Patent Application No. 2012-7034449 (dated Apr. 25, 2014).

Advisory Action for U.S. Appl. No. 13/154,119 dated Jan. 22, 2014.

Zhang et al., "TOHIP: A topology-hiding multipath routing protocol in mobile ad hoc networks," Ad Hoc Networks 21, pp. 109-122 (2014).

Final Office Action for U.S. Appl. No. 13/154,119 dated Oct. 25, 2013.

Notice of Allowance and Fee(s) Due for U.S. Appl. No. 13/021,402 (dated Sep. 9, 2013).

Non-Final Office Action for U.S. Appl. No. 13/154,119 dated May 2, 2013.

Communication of European publication number and information on the application of Article 67(3) EPC for European Patent Application No. 11792956.2 (dated Mar. 13, 2013).

"EliteDSC—LTE Roaming," http://www.elitecore.com/telecompractices/lteroaming.html, pp. 1-2 (Copyright 2013).

Non-Final Office Action for U.S. Appl. No. 13/021,402 (dated Nove. 8, 2012).

Hardt, "The OAuth 2.0 Authorization Framework", Internet Engineering Task Force (IETF) Request for Comments (RFC) 6749, pp. 1-76 (2012).

Notification of Transmittal of the International Search Report and the Written Opinion of the International Searching Authority, or the Declaration for International Application No. PCT/US2011/039285 (dated Feb. 9, 2012).

Notification of Transmittal of the International Search Report and the Written Opinion of the International Searching Authority, or the Declaration for International Application No. PCT/US2011/023752 (dated Oct. 26, 2011).

"Topology Hiding," Chapter 13, Cisco Unified Border Element (SP Edition) Configuration Guide: Distributed Model, pp. 13-1-13-10 (Mar. 29, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).

3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).

Chiba et al., "Dynamic Authorization Extensions to Remote Authentication Dial In User Service (RADIUS)," RFC 5176, pp. 1-31 (Jan. 2008).

"Features—Kamailio (OpenSER) SIP Server," http://www.kamailio.org/w/features/, pp. 1-3 (Copyright 2008-2015).

Rouse, M., "Platform," searchservervirtualization.techtarget.com/definition/platform, pp. 1-2 (Sep. 2006).

Leach et al., "A Universally Unique IDentifier (UUID) URN Namespace," Network Working Group, RFC 4122, pp. 1-32 (Jul. 2005).

Calhoun et al., "Diameter Base Protocol," RFC 3588, pp. 1-147 (Sep. 2003).

Calhoun et al., "Diameter Base Protocol,"draft-ietf-aaa-diameter-07, Section 6.3, p. 68 (Jul. 2001).

Calhoun et al., "Diameter Base Protocol," The Internet Society, pp. 1-64 (Mar. 2001).

Rigney et al., "RADIUS Accounting," RFC 2866, pp. 1-28 (Jun. 2000).

Rigney et al., "Remote Authentication Dial In User Service (RADIUS)," RFC 2865, pp. 1-68 (Jun. 2000).

Farago et al., "Virtual path network topology optimization using random graphs," INFOCOM '99, 18th Annual Joint Conference of the IEEE Computer and Communications Societies, vol. 2, pp. 491-496 (Mar. 1999).

Goldschlag et al., "Hiding Routing Information," Springer Berlin Heidelberg, First International Workshop Cambridge, U.K., May

(56) References Cited

OTHER PUBLICATIONS

30-Jun. 1, 1996, Information Hiding Lecture Notes in Computer Science, vol. 1174, pp. 137-150 (1996).
Notice of Allowance and Fee(s) Due for U.S. Appl. No. 17/308,972 (dated Nov. 18, 2022).
Commonly-assigned, co-pending U.S. Appl. No. 17/987,820 for "Methods, Systems, and Computer Readable Media for Detecting Stolen Access Tokens," (Unpublished, filed Nov. 15, 2022).
Housley et al. "Internet X.509 Public Key Infrastructure Certificate and CRL Profile," Network Working Group, Request for Comments: 2459, pp. 1-129 (Jan. 1999).
Jones et al., "JSON Web Token (JWT)," Internet Engineering Task Force (IETF), Request for Comments: 7519, pp. 1-30 (May 2015).
"3rd Generation Partnership Project; Technical Specification Group Core Network and Terminals; 5G System; Network Function Repository Services; Stage 3 (Release 17),", 3GPP TS 29.510, V17.6.0, pp. 1-306 (Jun. 2022).
"3rd Generation Partnership Project; Technical Specification Group Services and System Aspects; Security architecture and procedures for 5G system (Release 17)," 3GPP TS 33.501, V17.7.0, pp. 1-292 (Sep. 2022).
Final Office Action for U.S. Appl. No. 17/314,382 (dated Nov. 9, 2022).
Notice of Allowance and Fee(s) Due for U.S. Appl. No. 17/314,300 (dated Sep. 27, 2022).
Notice of Allowance and Fee(s) Due and Examiner-Initiated Interview Summary for U.S. Appl. No. 17/145,143 (dated Sep. 2, 2022).
Notice of Allowance and Fee(s) Due and Examiner-Intiated Interview Summary for U.S. Appl. No. 17/145,143 (dated Aug. 11, 2022).
Non-Final Office Action for U.S. Appl. No. 17/308,972 (dated Aug. 5, 2022).
Notification of Transmittal of the International Search Report and the Written Opinion of the International Searching Authority, or the Declaration for International Application No. PCT/US2022/023894 (dated Aug. 1, 2022).
"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).

\* cited by examiner

Deregistration Res without suspect timer

Deregistration Res without suspect timer

METHODS, SYSTEMS, AND COMPUTER READABLE MEDIA FOR PROTECTING AGAINST MASS NETWORK FUNCTION (NF) DEREGISTRATION ATTACKS

TECHNICAL FIELD

The subject matter described herein relates to security in telecommunications networks. More particularly, the subject matter described herein relates to methods, systems, and computer readable media for protecting against mass NF deregistration attacks.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks is vulnerability to mass NF deregistration attacks. 3GPP TS 29.510 defines the NRF to support the service discovery function in the 5G core network. Producer NFs register with the NRF, so that consumer NFs can discover them and send service based interface (SBI) requests. The NRF also provides NRF management APIs to register, update, and deregister the NF to manage the NF life cycle. The service operation used to deregister the NF is referred to as the NFDeregister service operation and is used to deregister an NF with the NRF by deleting the NF profile of the NF stored by the NRF. One issue with the NFDeregister service operation is that it can be misused by a hacker to mass deregister NFs and make 5G services unavailable. The result of a successful deregistration with the NRF is deletion of the NF profile of an NF instance in the NF profile database of the NRF, making the NF instance non-discoverable. If all of the NF instances of a given type are deregistered, access to the service provided by the NFs will be unavailable, and a network outage will occur.

Although the NRF authenticates the user during an NFDeregister service operation, a hacker can find weaknesses in the authentication mechanism. As a result, there is a need for a more robust defense, i.e., a redundant mechanism to avoid mass NF deregistration attack.

In light of these and other difficulties, there exists a need for improved methods, systems, and computer readable media for protecting against mass NF deregistration attacks.

SUMMARY

A method for protecting against mass NF deregistration attacks can be performed at an NRF or SCP. The method includes receiving an NFDeregister request for deregistering an NF. The method further includes classifying the NFDeregister request as suspect based on application of suspect NFDeregister request classification rules. The method further includes in response to classifying the NFDeregister request as suspect, queueing the NFDeregister request. The method further includes receiving an NF heart-beat message concerning the NF. The method further includes determining that the NF heart-beat message is received within an NF heart-beat time interval for the NF. The method further includes in response to determining that the NF heart-beat message is received within the NF heart-beat time interval for the NF, preventing processing of the NF Deregister request and blacklisting a sender of the NFDeregister request.

According to another aspect of the subject matter described herein, classifying the NFDeregister request as suspect based on application of suspect NFDeregister request classification rules includes classifying the NFDeregister request as suspect in response to determining that processing the NFDeregister request would cause a number of available NFs of a same type as the NF to be below a minimum operator-defined threshold.

According to another aspect of the subject matter described herein, classifying the NFDeregister request as suspect based on application of suspect NFDeregister request classification rules includes classifying the NFDeregister request as suspect in response to a rate of NFDeregister requests exceeding an operator-defined threshold.

According to another aspect of the subject matter described herein, classifying the NFDeregister request as suspect based on application of suspect NFDeregister request classification rules includes classifying the NFDeregister request as suspect based on a detected difference between a learned past traffic pattern and a current traffic pattern of which the NFDeregister request is a part.

According to another aspect of the subject matter described herein, classifying the NFDeregister request as suspect based on application of suspect NFDeregister request classification rules includes classifying the NFDeregister request as suspect by default.

According to another aspect of the subject matter described herein, the receiving, classifying, determining, preventing processing, and blacklisting are performed at the NRF and the method for protecting against mass NF deregistration attacks further includes, in response to classifying the NFDeregister request as suspect, transitioning to a SUSPECTED state, and, in the SUSPECTED state, applying operator-defined policies that determine whether to send NFDeregister responses and to respond to NFDiscover requests.

According to another aspect of the subject matter described herein, the method for protecting against mass NF deregistration attacks includes responding to the NFDeregister request with an NFDeregister response, and inserting, in the NFDeregister response, a suspect timer for instructing the NF to delay shutdown until expiration of the suspect timer.

According to another aspect of the subject matter described herein, the receiving, classifying, determining, preventing processing, and blacklisting are performed at the SCP and preventing processing of the NFDeregister request includes refraining from forwarding the NFDeregister request to the NRF.

According to another aspect of the subject matter described herein, the method for protecting against mass NF deregister attacks includes, at the SCP, responding, on behalf of the NRF, to the NFDeregister request with an NFDeregister response.

According to another aspect of the subject matter described herein, a system for protecting against mass network function (NF) deregistration attacks is provided. The system includes an NRF or SCP including at least one processor and a memory. The system further includes a mass NF deregistration attack mitigation module implemented by the at least one processor for receiving an NFDeregister request for deregistering an NF, classifying the NFDeregister request as suspect based on application of suspect NFDeregister request classification rules, in response to classifying the NFDeregister request as suspect, queueing the NFDeregister request, receiving an NF heart-beat message concerning the NF, determining that the NF heart-beat message is received within an NF heart-beat time interval for the NF, and, in response to determining that the NF heart-beat message is received within the NF heart-beat time interval for the NF, preventing processing of the NF Deregister request and blacklisting a sender of the NFDeregister request.

According to another aspect of the subject matter described herein, the mass NF deregistration attack mitigation module is configured to classify the NFDeregister request as suspect in response to determining that processing the NFDeregister request would cause a number of available NFs of a same type as the NF to be below a minimum operator-defined threshold.

According to another aspect of the subject matter described herein, the mass NF deregistration attack mitigation module is configured to classify the NFDeregister request as suspect in response to a rate of NFDeregister requests exceeding an operator-defined threshold.

According to another aspect of the subject matter described herein, the mass NF deregistration attack mitigation module is configured to classify the NFDeregister request as suspect based on a detected difference between a learned past traffic pattern and a current traffic pattern of which the NFDeregister request is a part.

According to another aspect of the subject matter described herein, the mass NF deregistration attack mitigation module is configured to classify the NFDeregister request as suspect by default.

According to another aspect of the subject matter described herein, the NRF or SCP comprises an NRF, and the mass NF deregistration attack mitigation module is configured to, in response to classifying the NFDeregister request as suspect, transition to a SUSPECTED state, and, in the SUSPECTED state, apply operator-defined policies that determine whether to send NFDeregister responses and to respond to NFDiscover requests.

According to another aspect of the subject matter described herein, the mass NF deregistration attack mitigation module is configured to respond to the NFDeregister request with an NFDeregister response; and insert, in the NFDeregister response, a suspect timer for instructing the NF to delay shutdown until expiration of the suspect timer.

According to another aspect of the subject matter described herein, the NRF or SCP comprises an SCP and the mass NF deregistration attack mitigation module is configured to prevent processing of the NFDeregister request by refraining from forwarding the NFDeregister request to the NRF.

According to another aspect of the subject matter described herein, the mass NF deregistration attack mitigation module is configured to responding, on behalf of the NRF, to the NFDeregister request with an NFDeregister response.

According to another aspect of the subject matter described herein, A non-transitory computer readable medium having stored thereon executable instructions that when executed by a processor of a computer control the computer to perform steps is provided. The steps are performed at an NRF or SCP. The steps include receiving an NFDeregister request for deregistering an NF. The steps further include classifying the NFDeregister request as suspect based on application of suspect NFDeregister request classification rules. The steps further include in response to classifying the NFDeregister request as suspect, queueing the NFDeregister request. The steps further include receiving an NF heart-beat message concerning the NF. The steps further include determining that the NF heart-beat message is received within an NF heart-beat time interval for the NF. The steps further include, in response to determining that the NF heart-beat message is received within the NF heart-beat time interval for the NF, preventing processing of the NF Deregister request and blacklisting a sender of the NFDeregister request.

According to another aspect of the subject matter described herein, a method for protecting against mass network function (NF) deregistration attacks is provided. The method includes, at an NRF including at least one processor and a memory, receiving an NFDeregister request for deregistering an NF. The method further includes storing, in the memory, a copy of an NF profile of the NF. The method further includes processing or forwarding the NFDeregister request to deregister the NF. The method further includes receiving an NF heart-beat message concerning the NF. The method further includes determining that the NF heart-beat message is received within an NF heart-beat time interval for the NF. The method further includes, in response to determining that the NF heart-beat message is received within the NF heart-beat time interval, restoring registration of the NF using the stored copy of NF profile.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
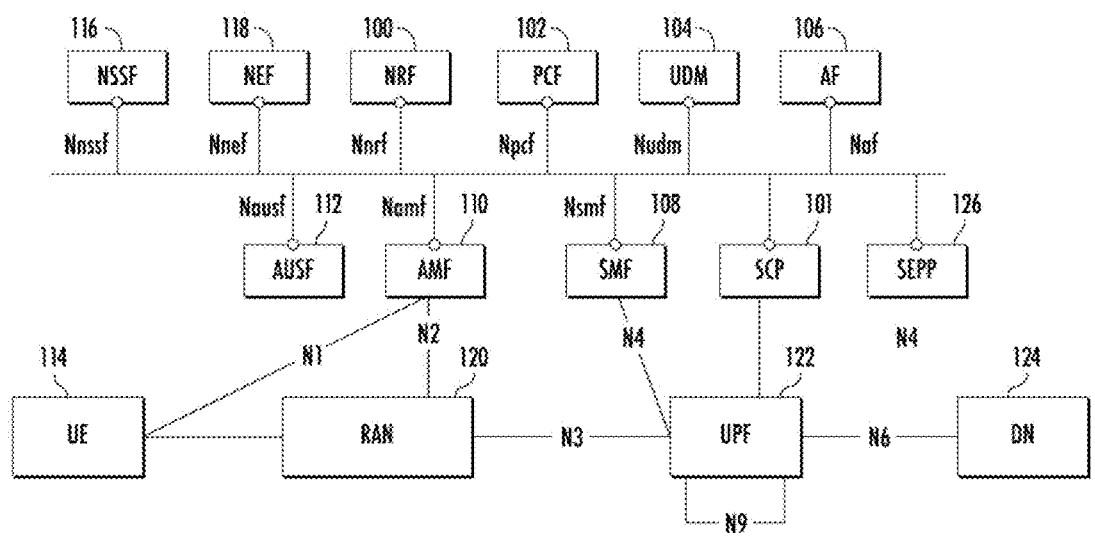
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a user defined management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
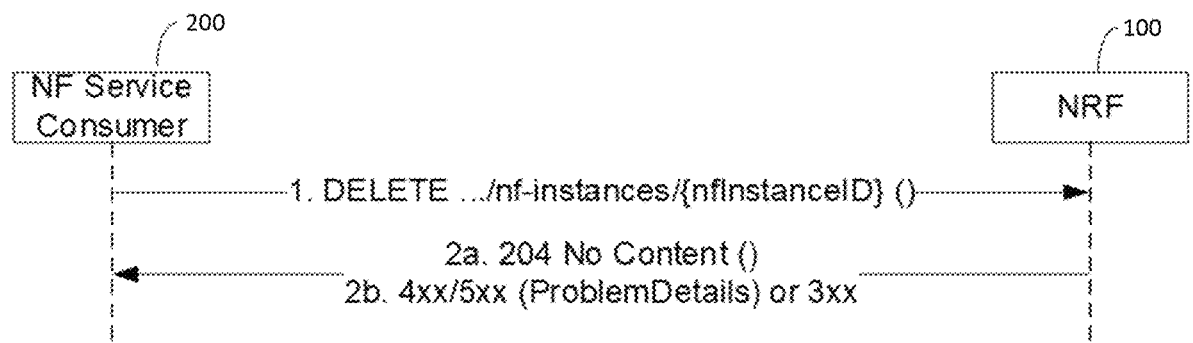
FIG. 2 is a message flow diagram illustrating exemplary messages exchanged for an NFDeregister service operation.

As stated above, one problem in 5G networks is the vulnerability to the network against a mass NF deregistration attack where an attacker seeks to deregister some or all of the NF instances that provide one or more critical services to the network. FIG. 2 is a message flow diagram illustrating exemplary messages exchanged for the NFDeregister service operation. The NFDeregister service operation is a management API defined by 3GPP TS 29.510. According to the NFDeregister service operation, an NF service consumer or a hacker seeking to deregister and NF sends an NFDeregister request to the NRF. In FIG. 2, in line 1, the NFDeregister request is an HTTP DELETE message identifying the NF instances being deregistered by NF instance ID. NRF 100 receives the NFDeregister request and, if the request is successfully processed, in line 2*a*, NRF 100 returns a 204 No Content message. If the deregistration request is not successful or if the deregistration request is redirected to another NRF, NRF 100 returns a 4xx or 5xx message with problem details or a 3xx message indicating redirection. The result of successful processing of an NFDeregister request is the deletion of the NF profile in the NF profiles database of the NRF, which makes the NF undiscoverable by other NFs. It should be noted that the NFDeregister service operation is needed, especially in cloud native environments where NF instances are allocated and deallocated frequently as cloud resource requirements change.

Another service operation defined in 3GPP TS 29.510 is the NF heart-beat service operation. The NF heart-beat service operation is used by NFs to periodically indicate to the NRF that the NFs are still available to provide service. The NF heart-beat service operation is performed by having an NF periodically contact the NRF with an NFUpdate request message indicating that the NF is still available. If an NF fails to send an NFUpdate request within an NF heart-beat interval defined by the NRF in the registration response, the NRF marks the NF profile of the NF as unavailable.

Figure 3:
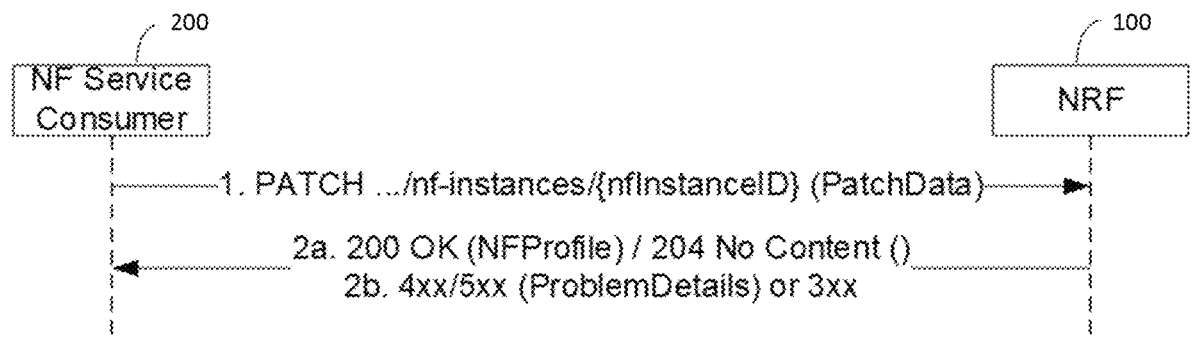
FIG. 3 is a message flow diagram illustrating exemplary messages exchanged for an NF heart-beat service operation.

FIG. 3 is a message flow diagram illustrating exemplary messages exchanged in the NF heart-beat service operation. Referring to FIG. 3, in line 1, NF service consumer 200 sends an NF heart-beat request message to NRF 100 identifying the NF instance to which the NF heart-beat request message applies. In line 2*a*, NRF 100 responds to the NF heart-beat request with a 200 OK message or a 204 No Content message if the NF heart-beat service operation is successful. If the NF heart-beat service operation is not successful or if redirection occurs, in line 2*b*, NRF 100 returns a 3xx, 4xx, or 5xx message. Thus, the NF heart-beat procedure provides a method for NRF 100 to ensure that NFs that are registered with NRF 100 are still operational.

When an NF is registered with the NRF, 3GPP TS 29.510 defines the following states of the NF:

TABLE 1

| 3GPP-Defined NF States | |
|---|---|
| Enumeration value | Description |
| "REGISTERED" | The NF instance is registered in NRF and can be discovered by other NFs. |
| "SUSPENDED" | The NF instance is registered in the NRF, but it is not operative and cannot be discovered by other NFs. This status may result from an NF Heart-Beat failure (see clause 5.2.2.3.2) or a NF failure and may trigger restoration procedures (see clause 6.2 of 3GPP TS 23.527). |
| "UNDISCOVERABLE" | This status may be set by the NF, e.g. in shutting down scenarios where the NF is still able to process requests for existing resources or sessions but cannot accept new resource creation or session establishment. |

In Table 1, the registered NF states include REGISTERED, where the NF profile is discoverable by other NFs, SUSPENDED, where the NF instance is registered but not operative or discoverable, and UNDISCOVERABLE, where the NF instance is registered but not discoverable by other NFs. Additional states that may be used to protect against mass NF deregistration attacks will be described below.

As stated above, one problem that can occur in 5G networks is a mass NF deregistration attack, where were a hacker deregisters some or all instances of an NF of a given type. The NFDeregister service operation is available to deregister an already registered NF and is a needed service for NFs to manage resource utilization. However, the NFDeregister service operation can be misused by hackers to mass deregister producer NFs, causing network outage. Normal rate limiting to limit the number of SBI requests based on HTTP method and uniform resource identifier (URI) is not sufficient to protected against a mass NFDeregister attack, as an attacker can stagger NFDeregister requests to pass the rate limiting check. Setting a rate limit for HTTP messages of a given type to a low value may not be ideal, as valid NFDeregister requests will be throttled. The 5G network is designed to be cloud native, which requires frequent NF registrations and deregistrations to create and remove network slices. There is a need to detect and reduced the likelihood of a successful mass NF deregistration attack.

Figure 4A:
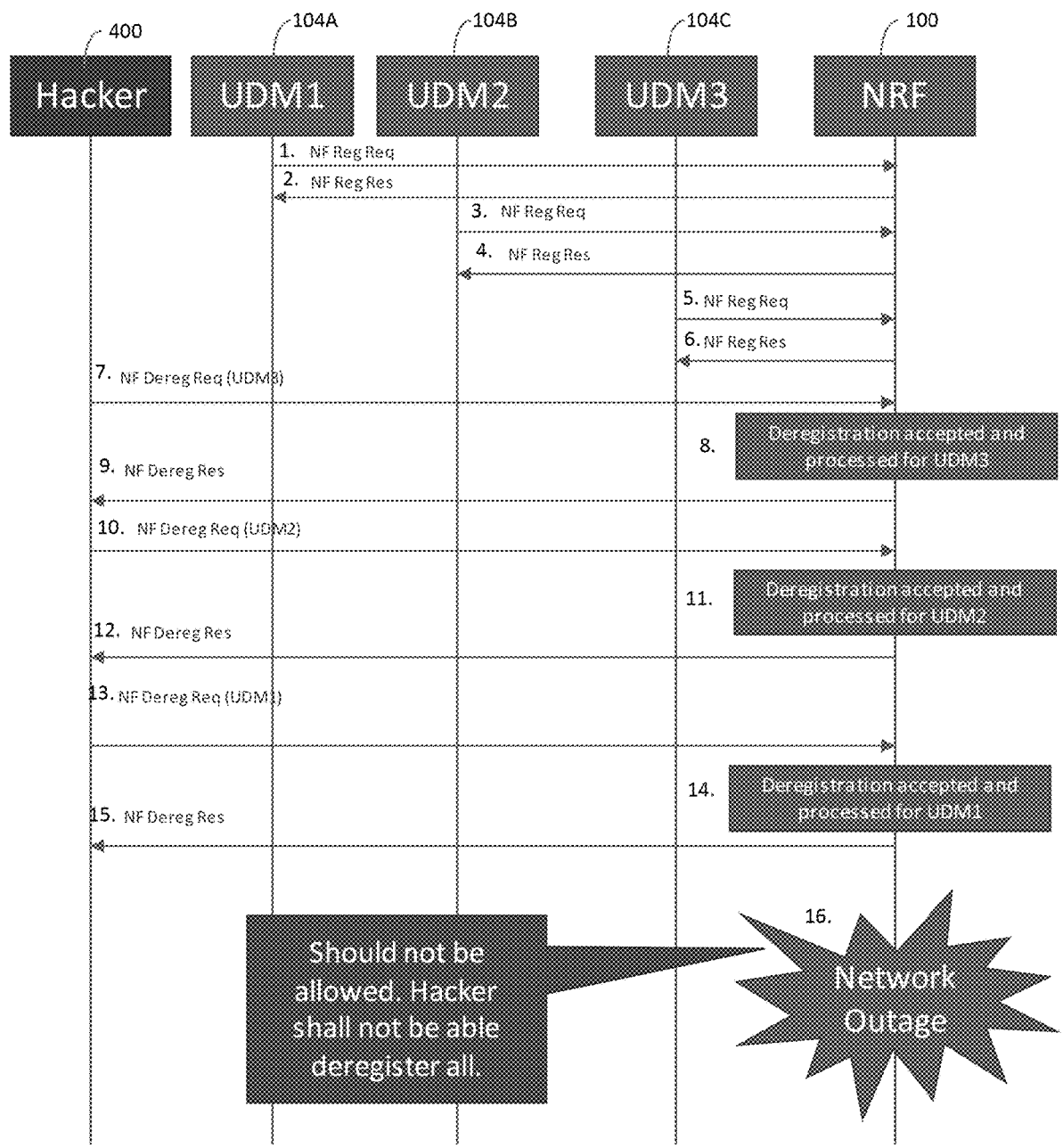
FIG. 4A is a message flow diagram illustrating exemplary messages exchanged for a mass NFDeregister attack where the messages do not pass through an SCP before reaching the NRF.

FIG. 4A is a message flow diagram illustrating exemplary messages that may be exchanged in a mass NF deregistration attack where the messages do not pass through an SCP before reaching the NRF. In FIG. 4A, the network includes three UDM instances UDM1 104A, UDM2 104B, and UDM3 104C. A hacker 400 attempts to deregister all three UDM instances by sending an NFDeregister message to NRF 100 for each UDM instance. Referring to the message flow in FIG. 4A, in step 1, UDM1 104A sends an NFRegister request to NRF 100. NRF 100 registers UDM1 104A by storing its NF profile in the NF profiles database maintained by NRF 100 and, in step 2 responds with an NFRegister response message. After being registered with the NRF, UDM1 104A is discoverable by other NFs.

In step 3 of the message flow diagram, UDM2 104B sends an NFRegister request to NRF 100. NRF 100 registers UDM2 104B by storing its NF profile in the NF profiles database and, in step 4, responds with and NFRegister response message.

In step 5 of the message flow diagram, UDM3 104C sends an NFRegister request to NRF 100. NRF 100 registers UDM3 104C by storing its NF profile in the NF profiles database and responds in step 6 with an NFRegister response message. Thus, after step 6, UDMs 104A-104C are all discoverable and able to provide service in the network.

In step 7, hacker 400 sends an NFDeregister request identifying UDM3 104C to NRF 100. In step 8, NRF 100 accepts the NFDeregister request and deletes the NF profile for UDM3 104C. In step 9, NRF 100 sends an NFDeregister response to hacker 400. After step 9, UDM3 104C is no longer registered and thus not discoverable in the network. However, because UDM1 104A and UDM2 104B are still registered, UDM service is still available in the network.

In step 10, hacker 400 sends an NFDeregister request identifying UDM2 104B to NRF 100. In step 11, NRF 100 accepts the NFDeregister request and deletes the NF profile for UDM2 104B. In step 12, NRF 100 sends an NFDeregister response to hacker 400. After step 11, UDM2 104B is deregistered and thus undiscoverable by other NFs in the network. However, UDM service is still available because UDM1 104A is still registered.

In step 13, hacker 400 sends an NFDeregister request for deregistering UDM1 104A to NRF 100. In step 14, NRF 100 accepts the NFDeregister request and deletes the NF profile for UDM1 104A. In step 15, NRF 100 sends an NFDeregister response to hacker 400. After step 15, UDM service is no longer available. Because UDM service is essential to the proper functioning of the network, a network outage occurs, as indicated by step 16. Enhanced security measures should be implemented before allowing all or even a majority of NFs of a given type from being deregistered. The subject matter described herein provides such enhanced security measures, including classifying some NFDeregister requests as suspect, using NF heart-beat messaging to reverse NF deregistration operations, and storing copies of NF profiles that have been deregistered for subsequent restoration of an NF registration.

Figure 4B:
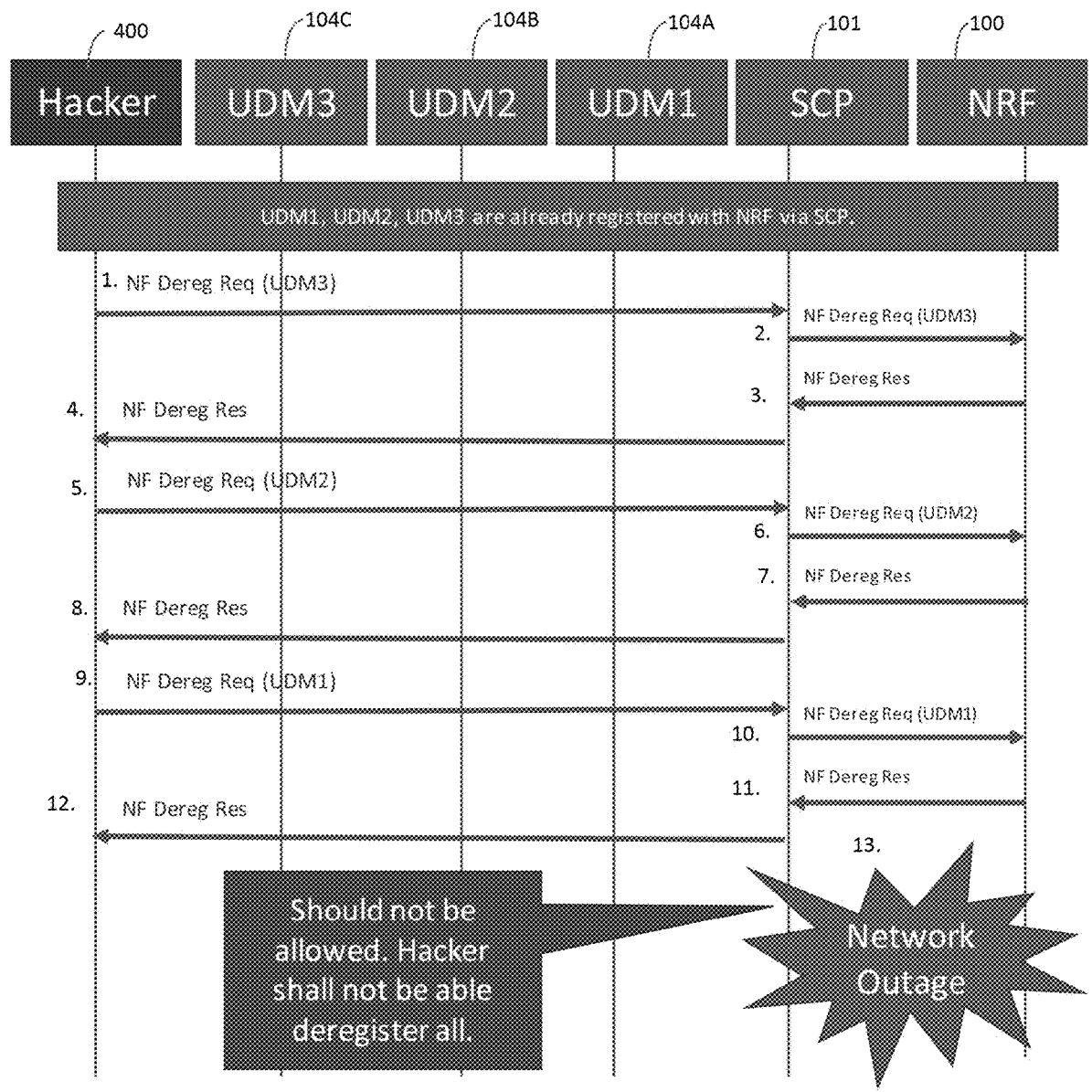
FIG. 4B is a message flow diagram illustrating exemplary messages exchanged for a mass NFDeregister attack where the messages pass through an SCP before reaching the NRF.

FIG. 4B is a message flow diagram illustrating exemplary messages exchanged for a mass NFDeregister attack where the messages pass through an SCP before reaching the NRF. The NFDeregister request messages in steps 1, 5, and 9 of FIG. 4B are the same as those in steps 7, 10, and 13 in FIG. 4A except that in FIG. 4B, the NFDeregister request messages are proxied by SCP 101 and forwarded to NRF 100 in steps 2, 6, and 10 of FIG. 4B. The corresponding NFDeregister responses are also proxied by SCP 101, as indicated by steps 3, 4, 7, 8, 11, and 12 in FIG. 4B. The net result in FIG. 4B is the same as that in FIG. 4A, i.e., when all of the UDMs are deregistered, a network outage occurs, as indicated by step 13 in FIG. 4B.

One enhanced security measure provided by the subject matter described herein is to mark or classify an NFDeregister service request as suspect when certain criteria are met as per operator-configured policies and queue the NFDeregister service request for later processing. If an NFDeregister service request is marked as suspect, NFs subscribed to receive notifications of changes in status of the NF for which the suspect NFDeregister request was received may be notified or not notified of the deregistration, depending on operator configuration. Discovery responses may or may not include the NF profile of the NF for which the suspect NFDeregister request was received, depending on operator configuration. An NFDeregister response sent to a client NF may include a suspect timer indicating to the client that the deregistration worked. The suspect timer indicates to the client NF that the NFDeregister request does not need to be retried.

Figure 5:
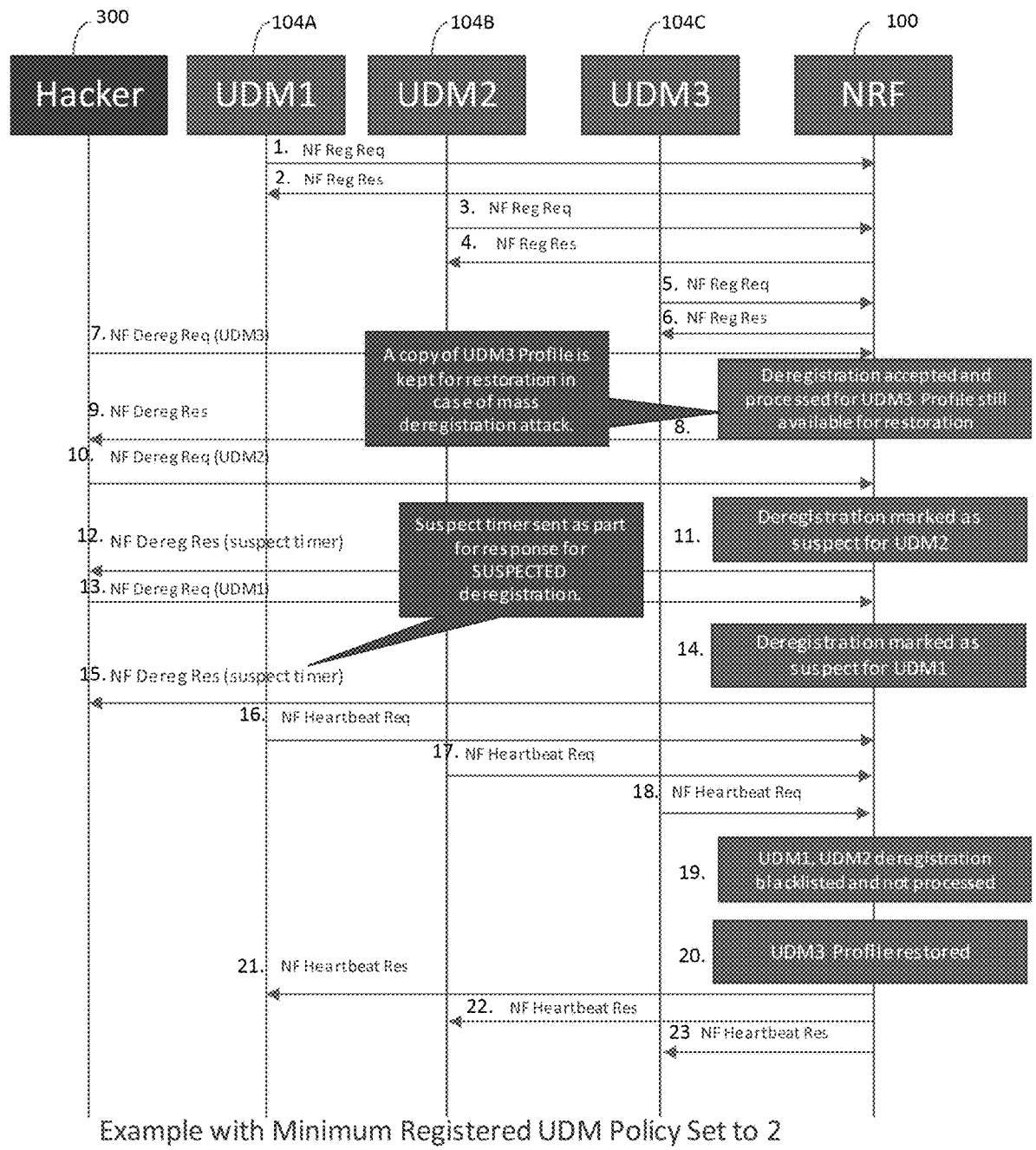
FIG. 5 is a message flow diagram illustrating exemplary messages exchanged using an NRF for protecting against a mass NFDeregister attack.

In another security enhancement, the queued NFDeregister service request is processed later only on not receiving an NF heart-beat (NFUpdate) prior to NF heart-beat timer expiry. Not receiving an NF heart-beat confirms that the deregistration was made by the NF owning the NF profile being deregistered. If an NF heart-beat is received for an NF that has a queued suspect deregistration request, the NF that sent the NFDeregister request may be marked as blacklisted and the network operator may be informed about a possible attack. If an NF heart-beat is received for a deregistered profile that was deregistered based on an NFDeregister request classified as normal or non-suspect, the NF profile may be restored. If the mass NF deregistration attack mitigation functionality is being implemented at an NRF, the restoration of the NF profile may be performed by keeping a copy of the NF profile when processing a normal (non-suspect) NFDeregister request. The copy may be stored by NRF 100 for at least the NF heart-beat timer duration. If an NF heart-beat message is received for the deregistered NF, NRF 100 may restore the NF profile of the NF using the stored copy. If the mass NF deregistration attack mitigation functionality is implemented at the SCP, when an NF heart-beat request is received for a deregistered NF, NRF 100 may send an NF heart-beat error message to the deregistered NF via the SCP. The SCP may forward the NF heart-beat error message to the NF, and the NF may re-register itself with the NRF. If an NFRegister request is received for an NF that has a queued suspect NFDeregister request, then the NF may be deregistered and then registered with the new profile. FIG. 5 is a message flow diagram illustrating exemplary messages exchanged when NRF 100 utilizes the methodology described herein for detecting and protecting against successful mass NF deregistration attacks. Referring to FIG. 5, in step 1, UDM1 104A sends an NFRegister request to NRF 100. NRF 100 registers UDM1 104A by storing its NF profile in the NF profiles database maintained by NRF 100 and, in step 2 responds with an NFRegister response message. After being registered with the NRF, UDM1 104A is discoverable by other NFs.

In step 3 of the message flow diagram, UDM2 104B sends an NFRegister request to NRF 100. NRF 100 registers UDM2 104B by storing its NF profile in the NF profiles database and, in step 4, responds with and NFRegister response message.

In step 5 of the message flow diagram, UDM3 104C sends an NFRegister request to NRF 100. NRF 100 registers UDM3 104C by storing its NF profile in the NF profiles database and responds in step 6 with an NF register response message. Thus, after step 6, UDMs 104A-104C are all discoverable and able to provide service in the network.

In step 7, hacker 400 sends an NFDeregister request identifying UDM3 104C to NRF 100. In step 8, NRF 100 accepts the NFDeregister request and deletes the NF profile for UDM3 104C. NRF 100 may accept the NFDeregister request by classifying the NFDeregister request as normal based on application of suspect NFDeregister request classification rules. For example, one rule may be that UDM service in the network must be provided by at least two UDMs. Because the NFDeregister request in step 7 only deregisters 1 of 3 UDMs, the NFDeregister request in step 7 may be classified as normal or non-suspect. Even though the NFDeregister request is classified as normal, NRF 100 may store a copy of the NF profile of NRF 100 for subsequent restoration of registration of the NF if a mass NF deregistration attack is detected.

In step 9, NRF 100 sends an NFDeregister response to hacker 400. After step 9, UDM3 104C is no longer registered and thus not discoverable in the network. However, because UDM1 104A and UDM2 104B are still registered, UDM service is still available in the network.

In step 10, hacker 400 sends an NFDeregister request identifying UDM2 104B to NRF 100. In step 11, NRF 100 applies the suspect NFDeregister request classification rules and classifies the NFDeregister request in step 10 as suspect. In response to classifying the NFDeregister request as suspect, NRF 100 may queue or otherwise delay processing of the NFDeregister request for a predetermined time interval, which may be at least equal to the NF heart-beat time interval for the NF instance whose NF profile is identified in the NFDeregister request.

Figure 6A:
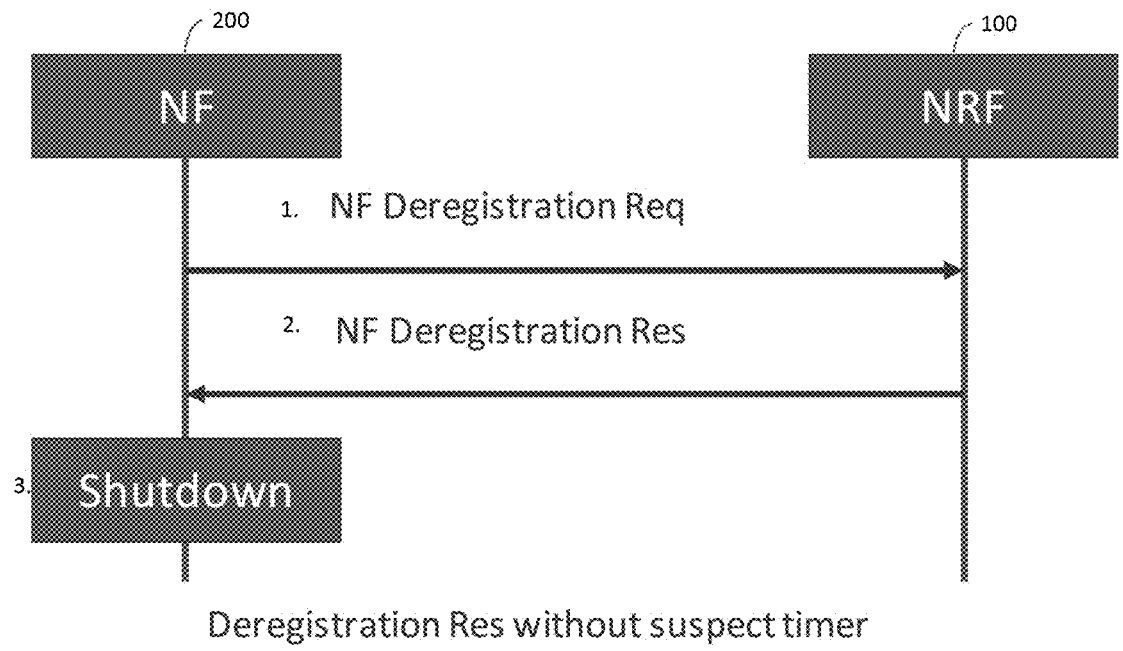
FIG. 6A is a message flow diagram illustrating exemplary messages exchanged between an NF and an NRF for NF deregistration and shutdown without a suspect timer.
Figure 6B:
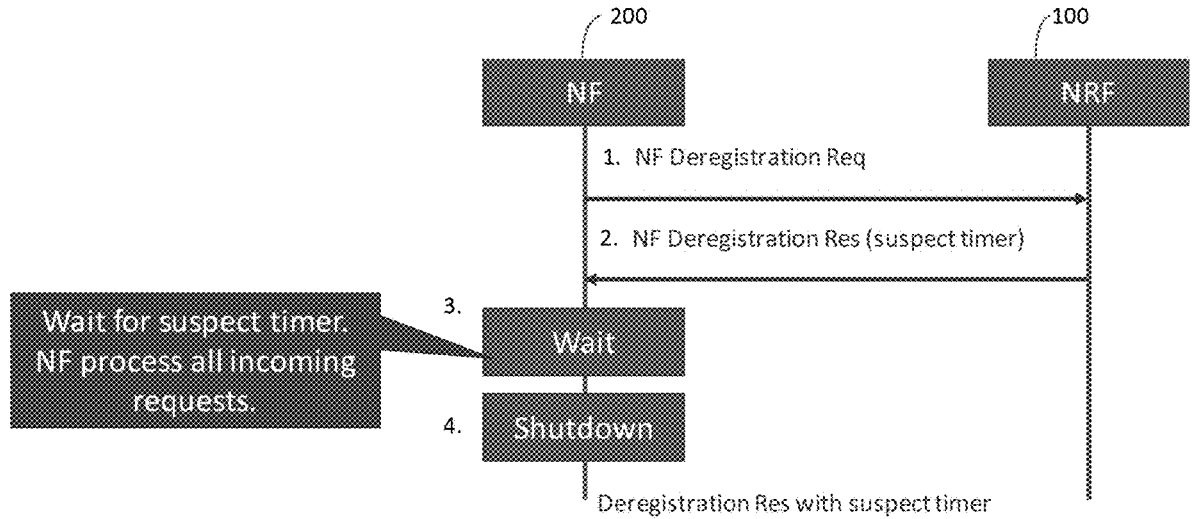
FIG. 6B is a message flow diagram illustrating exemplary messages exchanged between an NF and an NRF for NF deregistration, including a suspect timer to enable graceful shutdown of a deregistering NF.

In step 12, NRF 100 sends an NFDeregister response to hacker 400. NRF 100 may include a suspect timer in the NFDeregister response. The suspect timer may be a timer or an amount of time to wait before shutting down and/or resending the NFDeregister response. FIGS. 6A and 6B respectively Illustrate the processing of an NFDeregister response without and with a suspect timer. In FIG. 6A, in step 1, NF 200 sends an NFDeregister request to NRF 100. In step 2, NRF 100 sends an NFDeregister response without a suspect timer. Upon receiving the NFDeregister response without the suspect timer, NF 200 shuts down, as indicated by step 3.

FIG. 6B illustrates the same message flow as FIG. 6A except that in step 2, the NFDeregister response includes a suspect timer. In step 3 of FIG. 6B, NF 200 delays processing of the NFDeregister response until the suspect timer expires. While waiting for the suspect timer to expire, NF 200 may respond to service requests from other NFs. NF 200 may also refrain from resending the NFDeregister request. When the suspect timer expires, NF 200 shuts down. Thus, the suspect timer allows for graceful shutdown of an NF that is legitimately deregistering itself.

Returning to the message flow in FIG. 5, in step 13, hacker 400 sends an NFDeregister request to NRF 100 for deregistering UDM1 104A. In step 14, NRF 100 applies the suspect NF deregistration request classification rules to the NFDeregister request and classifies the request as suspect. In response to classifying the NFDeregister request as suspect, NRF 100 may queue the request and formulate and send an NFDeregister response that includes a suspect timer. In step 15, NRF 100 sends the NFDeregister response with the suspect timer to hacker 400.

In steps 16-18 of the message flow diagram, UDMs 104A and 104B send NF heart-beat request messages to NRF 100. Because NFs that have requested deregistration should not send NF heart-beat requests, in step 19, NRF 100 blacklists the sender of the deregistrations for UDM1 104A and UDM2 104B, for which the NFDeregister requests were queued, classifies the NFDeregister requests as being components of a mass NFDeregister attack and notifies the network operator of the mass NFDeregister attack. In step 20, NRF 100 restores the NF profile of UDM3 104C using the copy of the NF profile stored in step 8. The sender of the NFDeregister requests in steps 7, 10, and 13 may be blacklisted such that further SBI service request messages from the sender are not processed. Thus, using the steps in FIG. 5, a successful mass NF deregistration attack is prevented.

Figure 7A:
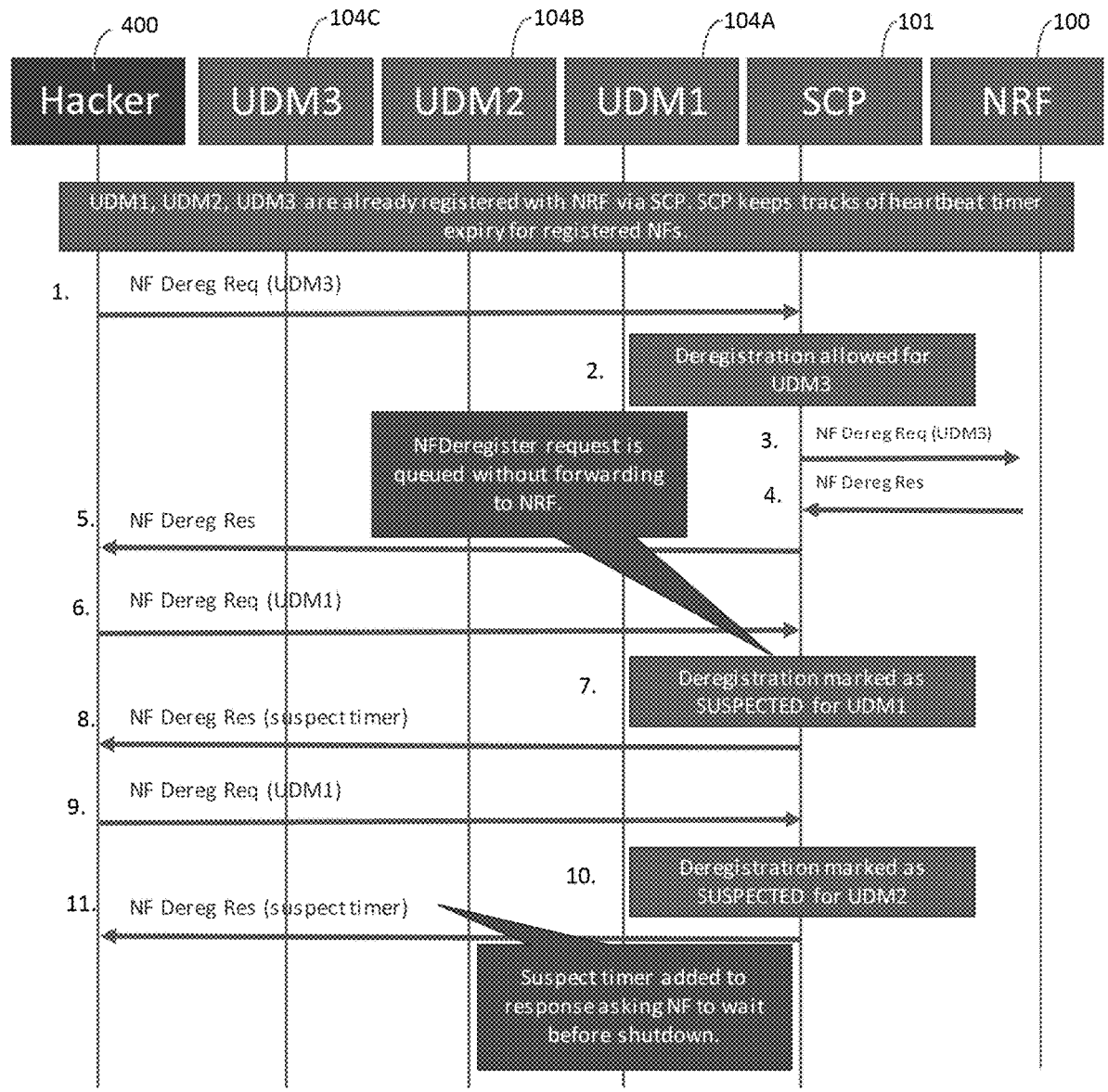
FIG. 7A is a message flow diagram illustrating exemplary messages exchanged using an SCP for protecting against a mass NFDeregister attack, where the SCP classifies NFDeregister requests that match operator-specified criteria as suspect and queues the suspect requests.

FIG. 7A is a message flow diagram illustrating exemplary messages exchanged using an SCP for protecting against a mass NFDeregister attack, where the SCP classifies NFDeregister requests that match operator-specified criteria as suspect and queues the suspect requests. The SCP tracks NF Deregister requests and NF heart-beat messages proxied through the SCP. The SCP uses the NF heart-beat timer to decide if an NFDeregister request identified as suspect (or non-suspect) was valid or invalid. As with the NRF implementation illustrated in FIG. 5, the SCP classifies an NFDeregister service request as suspect when certain criteria are met as per configured policies or rules of the network operator and queues the NFDeregister service request for later processing. For the NFDeregister requests identified as suspect, the SCP sends NFDeregister responses, each including a suspect timer, to the client NF, which gives an impression that deregistration worked, so the client NF does not need to retry the request. The SCP forwards NFDeregister requests classified as normal to the NRF and queues (i.e., stores and does not forward to the NRF) NFDeregister requests that are classified as suspect, so other NFs think that the NFs are not deleted. That is, NFs contacting the NRF will be able to discover service profiles of NFs with suspect NFDeregister requests that are queued by the SCP.

Referring to the message flow in FIG. 7A, In step 1, hacker 400 sends an NFDeregister request identifying UDM3 104C to SCP 101. In step 2, SCP 101 applies the operator-specified suspect NFDeregister request classification rules, classifies the request as non-suspect, and, in step 3, forwards the NFDeregister request to NRF 100, which deletes the NF profile for UDM3 104C. In step 4, NRF 100 sends an NFDeregister response to SCP 101. In step 5, SCP 101 forwards the NFDeregister response to hacker 400.

In step 6, hacker 400 sends an NFDeregister request identifying UDM2 104B to SCP 101. In step 7, SCP 101 applies the suspect NFDeregister request classification rules and classifies the NFDeregister request in step 6 as suspect. In response to classifying the NFDeregister request as suspect, SCP 101 may queue (i.e., prevent the forwarding of the NFDeregister request to NRF 100) the NFDeregister request for a predetermined time interval, which may be at least equal to the NF heart-beat time interval for the NF instance whose NF profile is identified in the NFDeregister request.

Figure 8A:
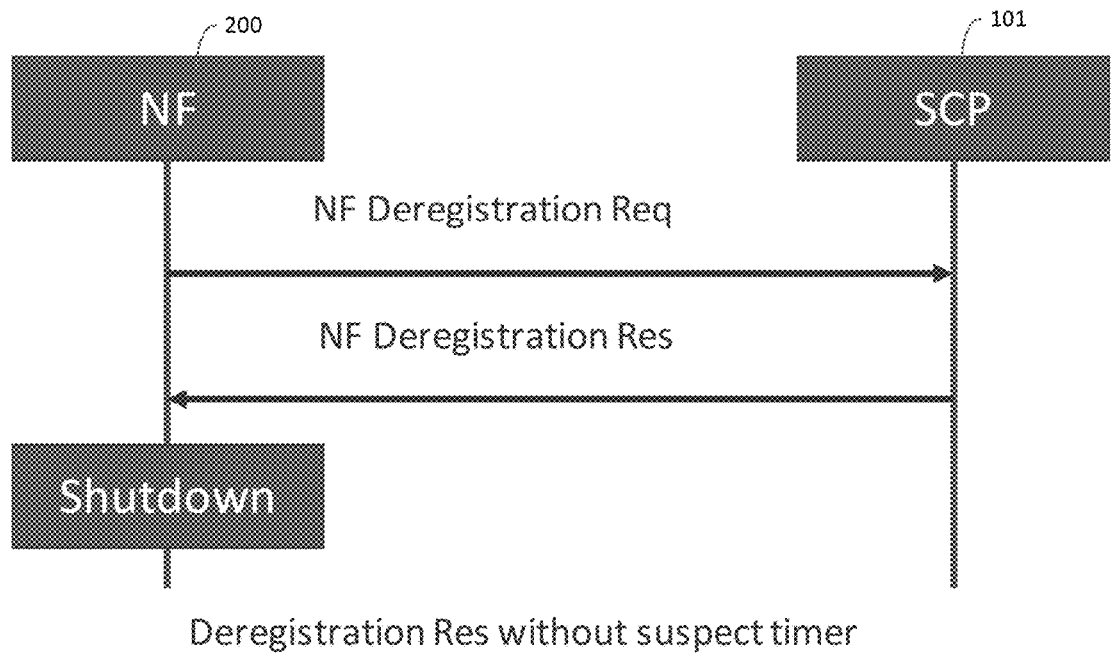
FIG. 8A is a message flow diagram illustrating exemplary messages exchanged between an NF and an SCP for NF deregistration and shutdown without a suspect timer.
Figure 8B:
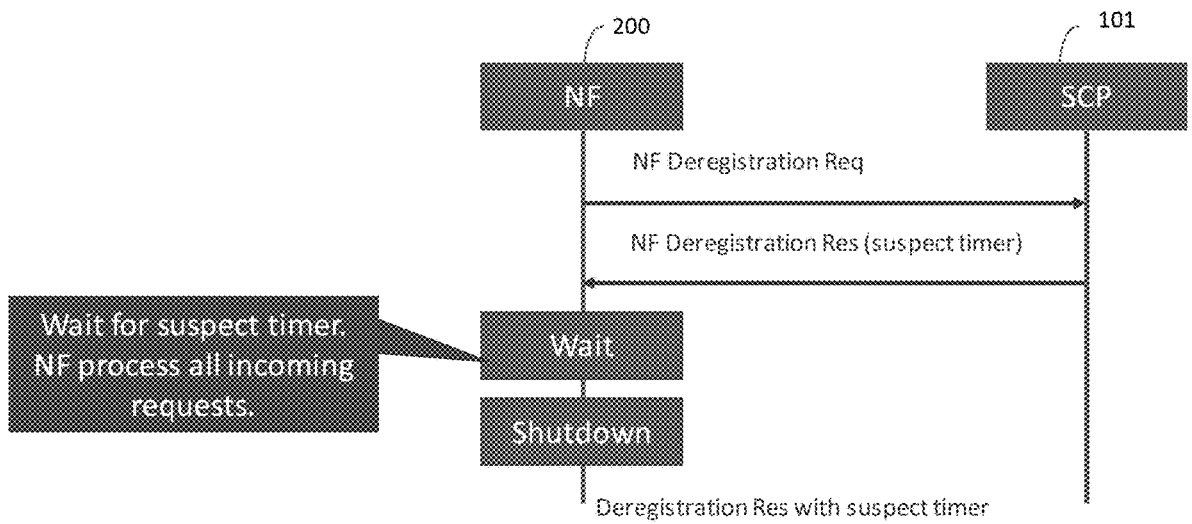
FIG. 8B is a message flow diagram illustrating exemplary messages exchanged between an NF and an SCP for NF deregistration, including a suspect timer to enable graceful shutdown of a deregistering NF.

In step 8, SCP 101 sends, on behalf of NRF 100, an NFDeregister response to hacker 400. SCP 101 may include a suspect timer in the NFDeregister response. The suspect timer, in the case of a legitimate NF deregistering itself, instructs the NF to wait until the suspect timer expires before shutting down. Messages exchanged between SCP 101 and a legitimate NF deregistering itself are illustrated in FIGS. 8A and 8B. The messages exchanged in FIGS. 8A and 8B are the same as those illustrated in FIGS. 6A and 6B except that the NFDeregister requests are terminated and queued by the SCP, rather than the NRF and the SCP sends the NF Deregistration responses to the NF on behalf of the NRF.

Figure 7B:
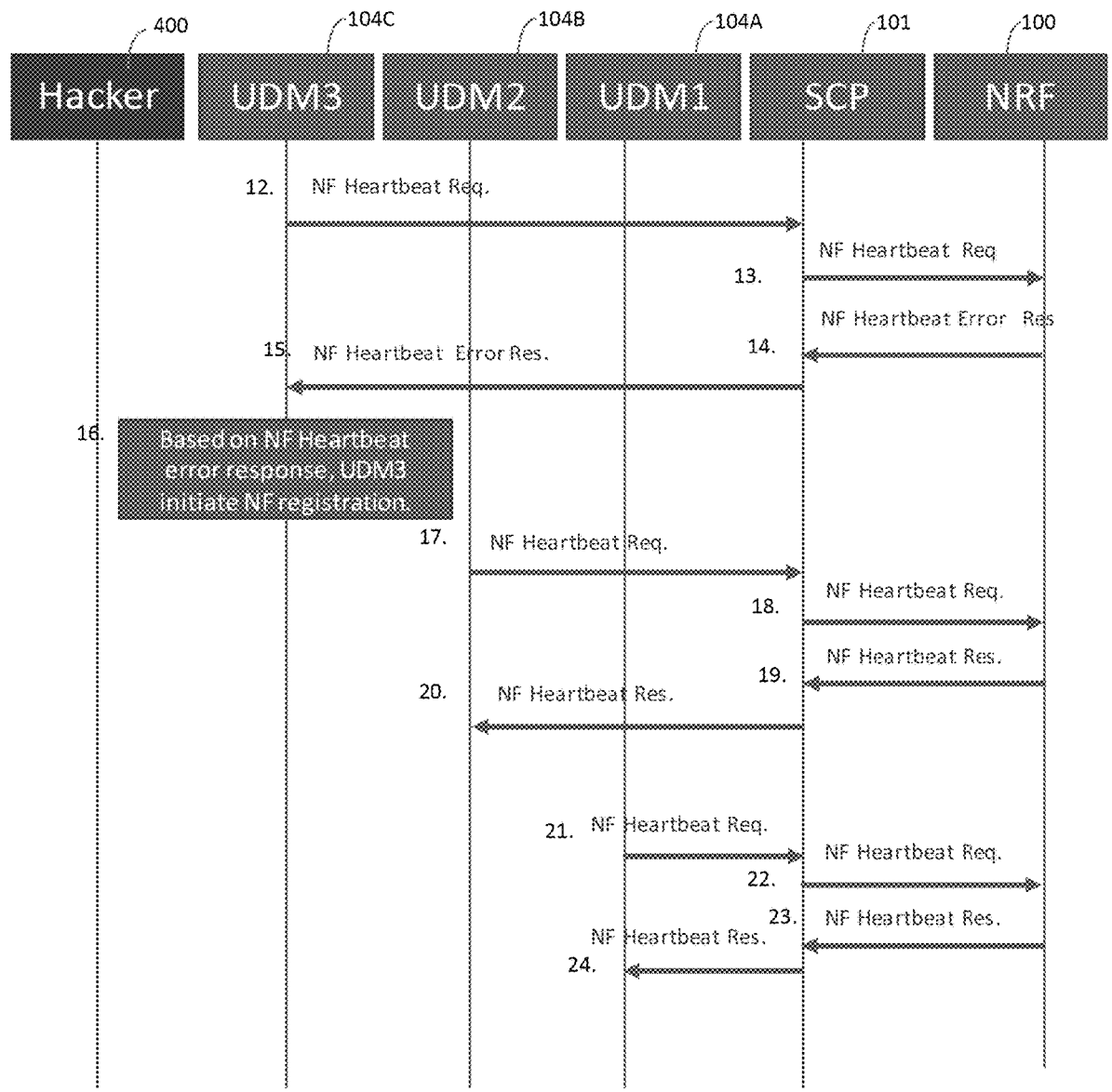
FIG. 7B is a continuation of the message flow in FIG. 7A where the SCP refrains from sending queued suspect NFDeregister requests to the NRF when NF heart-beat messages are received for the NFs during the NF heart-beat time intervals for the NFs.

FIG. 7B is a continuation of the message flow in FIG. 7A where the SCP refrains from sending queued suspect NFDeregister requests to the NRF when NF heart-beat messages are received for the NFs during the NF heart-beat time intervals for the NFs. A queued NFDeregister service request is sent to NRF only on not receiving an NF heart-beat (NFUpdate) in the future on NF heart-beat timer expiry. Not receiving an NF heart-beat confirms that the deregistration was made by the NF owning the profile. If an NF heart-beat is received for an NF that has a queued suspected deregistration request, the sender of the deregistration request may be blacklisted, and the network operator may be informed about a possible attack. If an NF heart-beat request is received for a deregistered profile, the NF heart-beat request is forwarded to the NRF. The NRF responds to the NF that sent the NF heart-beat request with an NF heart-beat response indicating an error. The deregistered NF may reregister with the NRF in response to receiving the NF heart-beat response indicating an error.

Referring to the message flow in FIG. 7B, in step 12, UDM3 104C sends and NF heart-beat request to SCP 101. In step 13, SCP 101 forwards the NF heart-beat request to NRF 100. Because the NF instance identified in the NF heart-beat request has been deregistered, in step 14, NRF 100 sends an NF heart-beat error response to SCP 101. In step 15, SCP 101 sends the NF heart-beat error response to UDM3 104C. In step 16, UDM3 104C, based on the NF heart-beat error response, re-registers itself with NRF 100.

In step 17, UDM2 104B transmits and NF heart-beat request to SCP 101. It is assumed that the NF heart-beat request is within the NF heart-beat interval for UDM2 104B. Because SCP 101 should not receive an NF heart-beat request for an NF for which an NFDeregister message has been received, SCP 101 blocks or refrains from sending the NFDeregister request for UDM2 104B to NRF 100, blacklists the sender of the NFDeregister request for UDM2 104B, and notifies the network operator of the presence of a possible mass NF deregistration attack. In step 18, SCP 101 forwards the NF heart-beat request to NRF 100. NRF 100 resets the NF heart-beat timer for UDM2 104B, and, in step 19, sends an NF heart-beat response to SCP 101. In step 20, SCP 101 sends the NF heart-beat response to UDM2 104B.

In step 21, UDM1 104A transmits and NF heart-beat request to SCP 101. It is assumed that the NF heart-beat request is within the NF heart-beat interval for UDM1 104A. Because SCP 101 should not receive an NF heart-beat request for an NF for which an NFDeregister message has been received, SCP 101 blocks or refrains from sending the NFDeregister request for UDM1 104A to NRF 100, blacklists the sender of the NFDeregister request for UDM1 104A and notifies the network operator of the presence of a possible mass NF deregistration attack. In step 22, SCP 101 forwards the NF heart-beat request to NRF 100. NRF 100 resets the NF heart-beat timer for UDM1 104A, and, in step 23, sends an NF heart-beat response to SCP 101. In step 24, SCP 101 sends the NF heart-beat response to UDM1 104A.

Figure 7C:
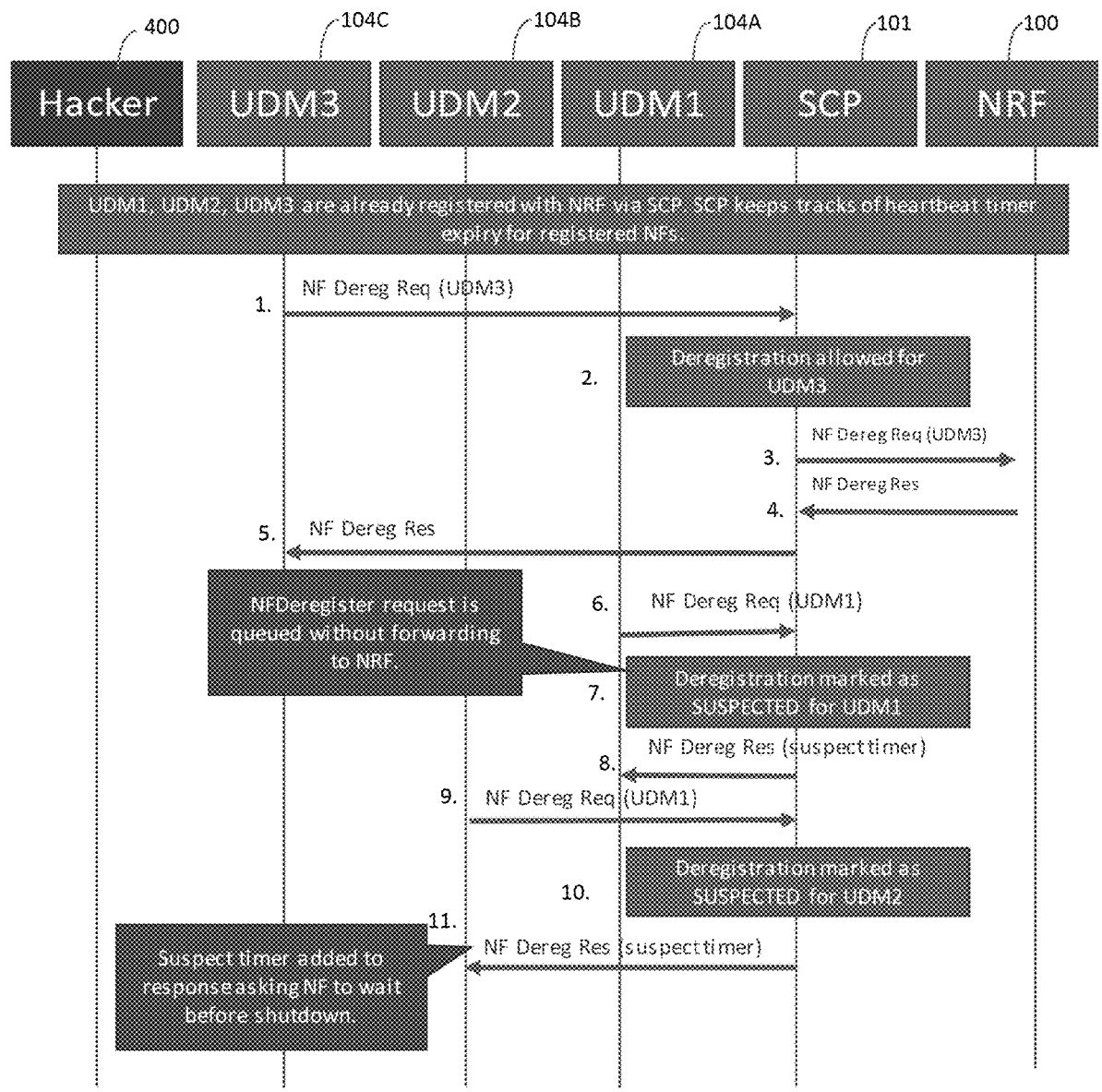
FIG. 7C is a message flow diagram illustrating exemplary messages exchanged using an SCP for protecting against a mass NFDeregister attack, where the SCP classifies NFDeregister requests that match operator-specified criteria as suspect and queues the suspect requests.
Figure 7D:
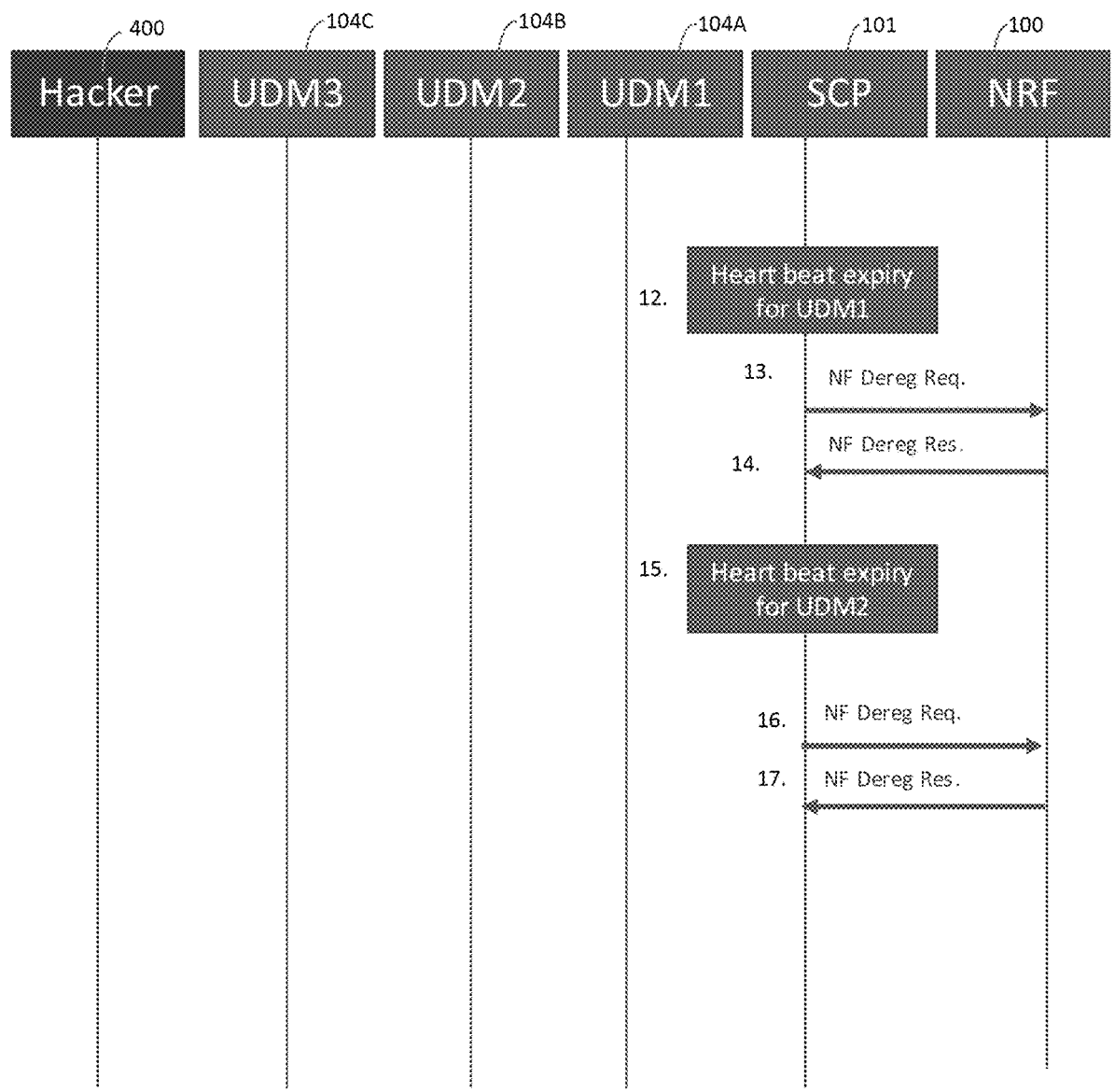
FIG. 7D is a continuation of the message flow in FIG. 7C where the SCP sends queued NFDeregister requests to the NRF when NF heart-beat requests are not received within the NF heart-beat time intervals for the NFs.

FIG. 7C is a message flow diagram illustrating exemplary messages exchanged using an SCP for protecting against a mass NFDeregister attack, where the SCP classifies NFDeregister requests that match operator-specified criteria as suspect and queues the suspect requests. The message flow in FIG. 7C is the same as that illustrated in FIG. 7A except that the NFDeregister requests in steps 1, 6, and 9 in FIG. 7C originate from UDMs 104C, 104B, and 104A instead of from hacker 400. The NFDeregister requests are classified as suspect in FIG. 7C using the suspect NFDeregister request classification rules. However, as illustrated in FIG. 7D, which continues the message flow in FIG. 7C, SCP 101 sends queued NFDeregister requests to the NRF when NF heart-beat requests are not received within the NF heart-beat time intervals for the NFs. Referring to the message flow illustrated in FIG. 7D, in step 12, SCP 101 determines that the NF heart-beat timer expires for UDM1 104A. In step 13, SCP 101 sends the queued NFDeregister request for UDM1 104A to NRF 100. In step 14, NRF 100 sends an NFDeregister response to SCP 101. It should be noted that SCP 101 does not forward the NFDeregister response to UDM1 104A, because SCP 101 already sent an NFDeregister response to UDM1 104A in step 9 in FIG. 7C. If an NFRegister, NFUpdate or NF heart-beat request is received from a blacklisted NF, the NFRegister, NFUpdate, or NF heart-beat request may be forwarded to the NRF, and the NF that sent the NFRegister, NFUpdate, or NF heart-beat request may be moved out of the list of blacklisted NFs.

In step 15, SCP 101 determines that the NF heart-beat timer expires for UDM2 104B. In step 16, SCP 101 sends the queued NFDeregister request for UDM2 104B to NRF 100. In step 17, NRF 100 sends an NFDeregister response to SCP 101. SCP 101 does not forward the NFDeregister response to UDM2 104B, because SCP 101 already sent an NFDeregister response to UDM2 104B in step 11 in FIG. 7C.

As indicated above, an NFDeregister request may be classified as suspect based on operator-defined suspect NFDeregister request identification rules or policies. The following are examples of policies that may be applied by NRF 100 or SCP 101 in classifying NFDeregister requests as suspect:

Minimum Registered: Deregistrations causing the number of registered NFs of a given type to be a below a configured minimum threshold will be classified as suspect. For example, the operator can select 2 as the minimum number of UDMs that should be registered in the network. If processing an NFDeregister request would cause the number of registered UDMs to go below 2, then the NFDeregister request is classified as suspect and queued for at least an NF heart-beat time interval to determine whether or not to process the NFDeregister request.

Max Rate: The operator may define a maximum allowed rate of NFDeregister requests. An NFDeregister request that would cause the maximum rate to be exceeded is classified as suspect. For example, if the operator sets the maximum rate to be 100 requests in one minute, an NFDeregister request that would cause the rate to exceed 100 requests in one minute will be classified as suspect.

Always: The operator may select "always" to classify all NFDeregister requests as suspect by default. In such a case, all NFDeregister requests would be queued for a time period to see if an NF heart-beat message is received within an NF heart-beat time interval for each NF for which deregistration is requested.

Auto: This means that the NRF learns past traffic patterns and classifies NFDeregister requests if they are part of a traffic pattern that is statistically different from learned passed traffic patterns. NRF 100 or SCP 101 may use a machine learning algorithm to learn the past traffic patterns. For example, if the machine learning algorithm learns that there are 5 deregistrations per hour on average, and the number of NF deregistrations in a given hour exceeds the average by more than one standard deviation, the NFDeregister requests that would cause the average number of deregistrations plus one standard deviation to be exceeded would be classified as suspect.

Policies can be logically combined, e.g., logically ANDed or ORed. An example of an ANDed policy is to classify an NFDeregister request as suspect when a deregistration will cause the rate of deregistrations to exceed the max rate threshold and the minimum number of available NFs to be below the minimum threshold.

Figure 9:
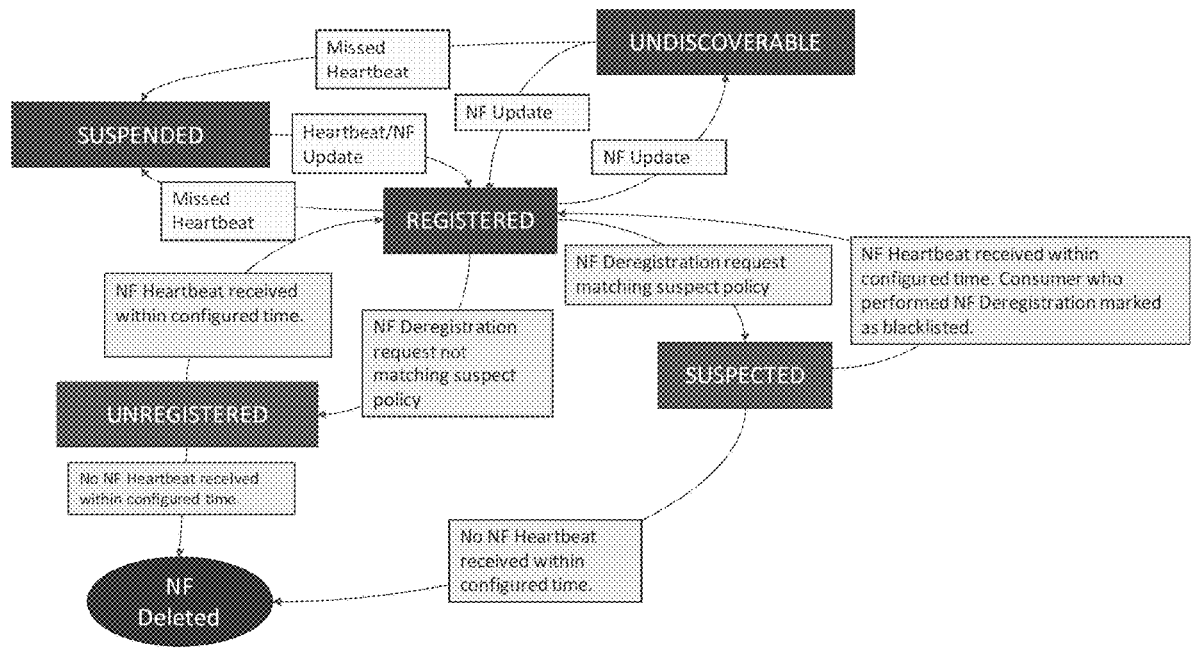
FIG. 9 is a state transition diagram illustrating exemplary state transitions associated with deregistering an NF protecting against mass NF deregistration attacks.

FIG. 9 is a state transition diagram illustrating exemplary state transitions of the NRF in implementing the 3GPP-defined NFUpdate, NFDeregister, and NF heart-beat service operations, as well as the mass NFDeregister attack mitigation procedures described herein. In FIG. 9, the REGISTERED, SUSPENDED, and UNDISCOVERABLE states are the same as those defined in 3GPP TS 29.510. The UNREGISTERED and SUSPENDED states are newly defined states that implement the mass NF deregistration attack mitigation procedures described herein. The NF DELETED state is the state that occurs when an NF profile is deleted. The arrows between the states represent state transitions, and the boxes on each arrow represent the conditions that cause a transition from one state to another. For example, when the NRF registers an NF profile, the NRF is in the REGISTERED state for the newly registered NF profile. From the REGISTERED state, when the NRF receives an NFDeregister request and classifies the NFDeregister request as suspect based on application of the NFDeregister request suspect classification rules, the NRF transitions to the SUSPECTED state. When in the SUSPECTED state, if an NF heart-beat message concerning the NF profile is received within a configured time period, the sender of the NFDeregister request is marked as blacklisted, and the NRF transitions to the REGISTERED state for the NF profile identified in the NF heart-beat message. When in the SUSPECTED state, if an NF heart-beat message concerning the NF is not received within the configured time period, the NRF deregisters the NF by deleting the NF profile from the NF profiles database and transitions to the NF DELETED state.

Returning to the REGISTERED state, in an NFDeregister request that does not match the suspect NF deregistration policy is received, the NRF transitions to the UNREGISTERED state for the NF profile. In the UNREGISTERED state, if an NF heart-beat message for the NF profile is not received within a configured time interval, the NRF deletes the NF profile and transitions to the NF DELETED state. In the UNREGISTERED state, if an NF heart-beat message is received within the configured time interval, the NRF transitions to the REGISTERED state for the NF profile. The remaining state transitions in FIG. 9 implement the standard NFUpdate and NF heart-beat service operations defined in 3GPP TS 29.510.

When in the SUSPECTED state, the NRF may implement operator-defined procedures to handle updates to subscribed NF and discovery requests. Table 2 shown below illustrates and example of operator-configurable policies for NF deregistration notifications to subscribed NFs and discovery responses that may be implemented by the NRF when in the SUSPECTED state for a particular NF profile.

TABLE 2

Configurable NRF Operations for NRF when in SUSPECTED State for NF Profile

| NF Criteria | Send Deregistration Notification | Include in Discovery Response |
| --- | --- | --- |
| NF Type = UDM | YES | YES |
| Locality = LOC1 | YES | NO |
| DEFAULT | NO | YES |

From Table 2, the first policy indicates that if the NF type is UDM and the NRF is in the SUSPECTED state for a UDM NF profile, the NRF sends deregistration notifications to subscribed NFs and includes the NF profile of the UDM in discovery responses, i.e., responses to NFDiscover requests. The second policy indicates that for NF profiles for NFs in LOC1, the NRF sends deregistration notifications but does not include the NF profile in discovery responses. The third policy is a default policy that indicates that if a particular NF profile does not match any of the other policy conditions, the default NRF behavior is not to send NF deregistration notifications and to include the NF profile in discovery responses. It should be noted that the policy examples in Table 2 are illustrative, and different policies for NF deregistration notifications and discovery responses can be configured without departing from the scope of the subject matter described herein.

Figure 10:
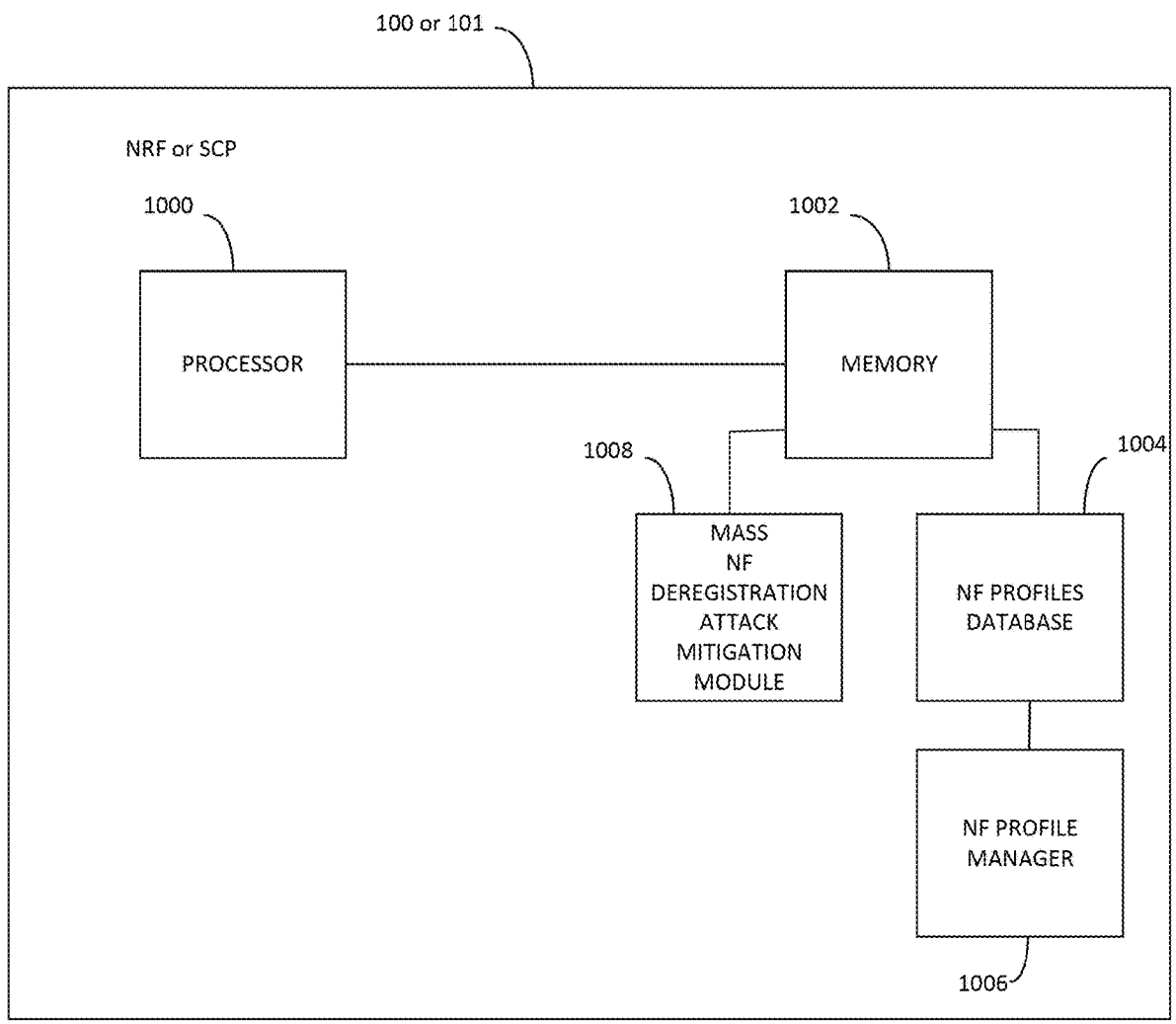
FIG. 10 is a block diagram illustrating an exemplary architecture for an NRF or SCP for protecting against mass NF deregistration attacks.

FIG. 10 is a block diagram illustrating an exemplary architecture for an NRF or SCP 100 or 101 that implements the mass NF deregistration attack mitigation procedures described herein. Referring to FIG. 10, NRF or SCP 100 or 101 includes at least one processor 1000 and a memory 1002. If NRF or SCP 100 or 101 is an NRF, the NRF may include an NF profiles database 1004 that stores the NF profiles of registered NFs and an NF profile manager 1006 that manages normal NF profile register, deregister, and update operations. If NRF or SCP 100 or 101 is an SCP, the NF profiles database and the NF profile manager may be implemented on an NRF that is separate from the SCP. NRF or SCP 100 or 101 includes a mass NF deregistration attack mitigation module 1008 that implements the subject matter described herein for reducing the likelihood of successful mass NF deregistration attacks. Mass NF deregistration attack mitigation module 1008 may be implemented using computer executable instructions stored in memory 1002 and executed by processor 1004.

Figure 11:
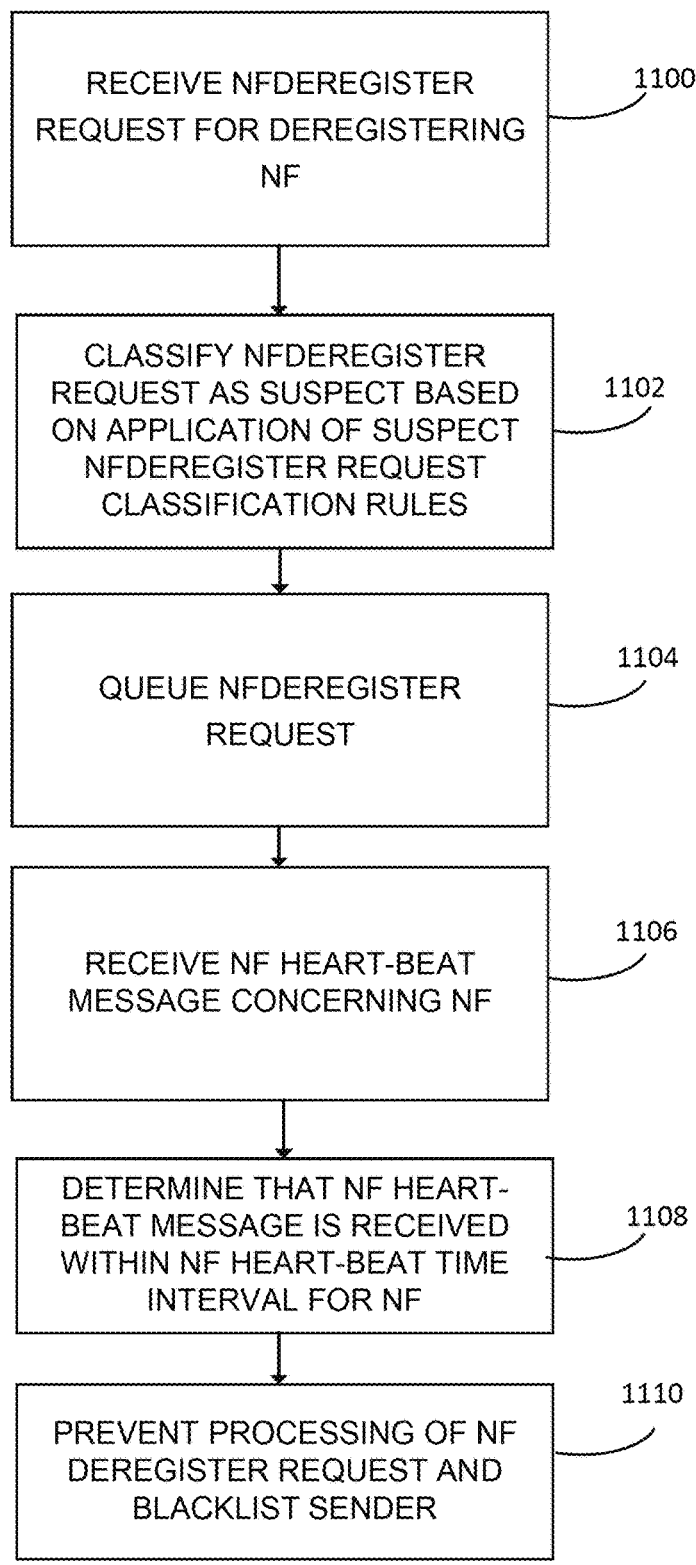
FIG. 11 is a flow chart illustrating an exemplary process performed by an NRF or an SCP for classifying NFDeregister requests and suspect and using NF heart-beat messages to protect against mass NF deregistration attacks.

FIG. 11 is a flow chart illustrating an exemplary process performed by an NRF or an SCP for classifying NFDeregister requests and suspect and using NF heart-beat messages to protect against mass NF deregistration attacks. The steps in FIG. 11 may be performed by mass NF deregistration attack mitigation module 1008 illustrated in FIG. 10. Referring to FIG. 11, in step 1100 the process includes receiving an NFDeregister request for deregistering an NF. For example, NRF or SCP 100 or 101 may receive an NFDeregister request for deregistering an NF.

In step 1102, the process includes classifying the NFDeregister request as suspect based on application of suspect NFDeregister request classification rules. For example, NRF or SCP 100 or 101 may classify the NFDeregister request as suspect based on application of any of the suspect NFDeregister request classification rules described herein.

In step 1104, the process includes, in response to classifying the NFDeregister request as suspect, queueing the NFDeregister request. For example, in an SCP implementation, SCP 101 may queue the NFDeregister request and refrain from forwarding the NFDeregister request to NRF 100. In an NRF implementation, NRF 100 may store the NFDeregister request in its memory and prevent processing of the NFDeregister request.

In step 1106, the process includes receiving an NF heart-beat message concerning the NF. For example, NRF or SCP 100 or 101 may receive an NF heart-beat message concerning the same NF or NFs as the queued NFDeregister request.

In step 1108, the process includes determining that the NF heart-beat message is received within an NF heart-beat time interval for the NF. For example, NRF or SCP 100 or 101 may determine that NF heart-beat message is received within the NF heart-beat time interval for an NF identified in the NFDeregister request.

In step 1110, the process includes, in response to determining that the NF heart-beat message is received within the NF heart-beat time interval for the NF, preventing processing of the NF Deregister request and blacklisting a sender of the NFDeregister request. For example, in an NRF implementation, the NRF may prevent processing of the queued NFDeregister request by discarding, ignoring, or writing over the request. The NRF may blacklist the sender of the request by refusing to process further communications from the sender. In an SCP implementation, the SCP may prevent processing of the queued NFDeregister request by discarding, ignoring, writing over or otherwise refraining from forwarding the NFDeregister request to the NRF. The SCP may blacklist the sender of the request by refusing to process or forward further communications from the sender.

Figure 12:
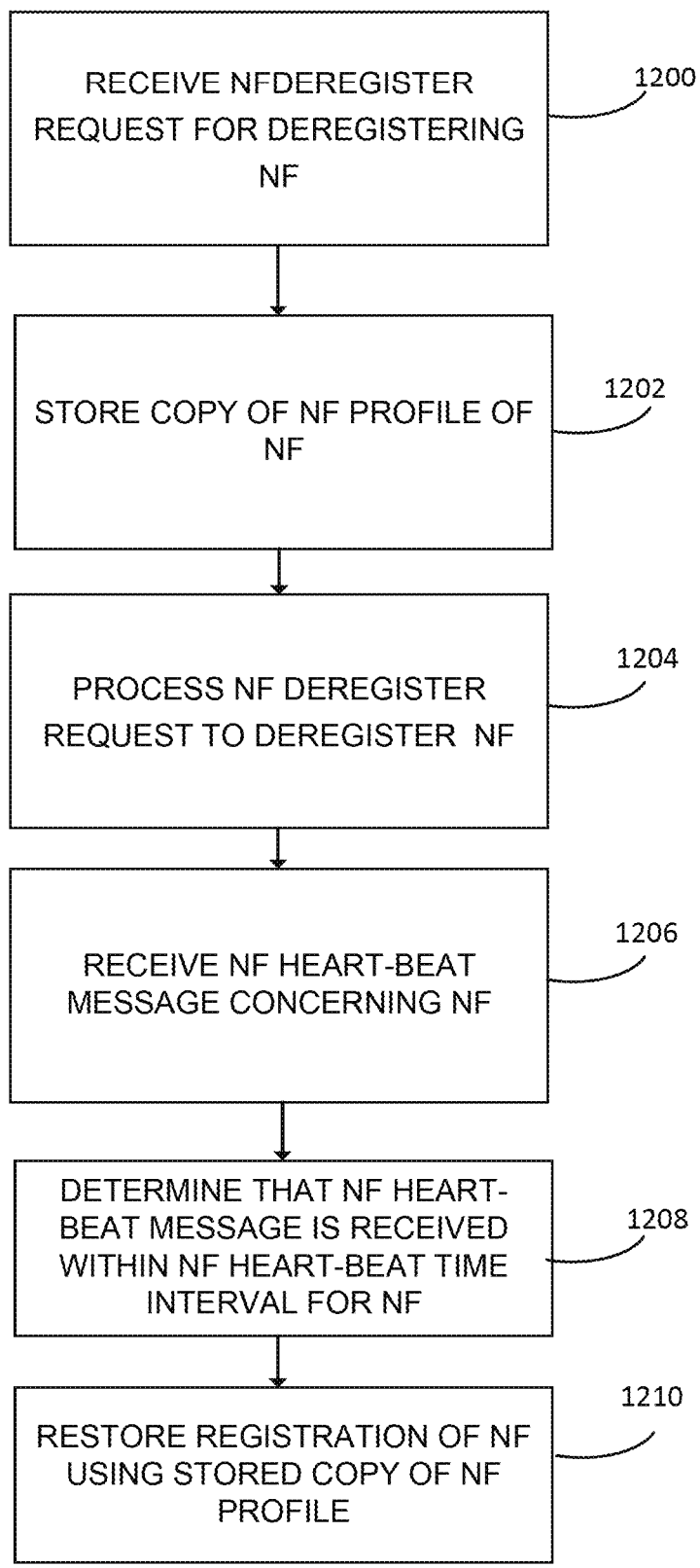
FIG. 12 is a flow chart illustrating an exemplary process performed by an NRF for restoring a deregistered NF profile after detecting a mass NF deregistration attack.

FIG. 12 is a flow chart illustrating an exemplary process performed by an NRF for restoring a deregistered NF profile after detecting a mass NF deregistration attack. Referring to FIG. 12, in step 1200, the process includes receiving an NFDeregister request for deregistering an NF. For example, NRF 101 may receive an NFDeregister request from a hacker or from a real NF seeking to deregister its NF profile.

In step 1202, a copy of the NF profile is stored. Step 1202 may be implemented if the NFDeregister request is classified as non-suspect through application of the suspect NFDeregister request classification rules.

In step 1204, the NFDeregister request is processed to deregister the NF. For example, the NFDeregister request may be processed, which results in the deletion of the NF profile in the NF profiles database maintained by the NRF and deregistration of the NF.

In step 1206, the process includes receiving an NF heart-beat message concerning the NF. For example, NRF 100 may receive an NF heart-beat message identifying the NF by its NF instance ID, which indicates that the NF is available to provide service.

In step 1208, the process includes determining that the NF heart-beat message is received within an NF heart-beat time interval for the NF. For example, NRF 100 may determine that the NF heart-beat message is received within the NF heart-beat time interval or prior to expiration of the NF heart-beat timer for the NF.

In step 1210, the process includes restoring, using the stored copy of the NF profile of the NF, the registration of the NF. For example, NRF 100 may restore the registration status of the NF by moving the stored copy of the NF profile of the NF to the NF profiles database and changing the registration status of the NF to REGISTERED.

The subject matter described herein may achieve at least the following advantages:
- Reduces the likelihood of a successful mass NF deregistration attack.
  - Mass deregistration can cause a network service to become unavailable, which can result in a network outage. The subject matter described herein reduces the likelihood of successful attacks that would cause such outages.
- Easy to implement.
  - Because the NRF or SCP already receives the NFDeregister messages that can be used to implement mass NF deregistration attacks, adding security features to screen such messages can be easily implemented.
- Can be implemented at either NRF or SCP.
  - Both the NRF and the SCP provide centralized locations for screening NFDeregister messages to reduce the likelihood of successful mass NF deregistration attacks.

The disclosure of each of the following references is hereby incorporated herein by reference in its entirety.

REFERENCES 1. 3$^{rd}$ Generation Partnership Project; Technical Specification Group Services and System Aspects; System architecture for the 5G System (5GS); Stage 2 (Release 17) 3GPP TS 23.501 V17.0.0 (2021-03).
2. 3$^{rd}$ Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for protecting against mass network function (NF) deregistration attacks, the method comprising:
   at an NF repository function (NRF) or a service communication proxy (SCP) including at least one processor and a memory:
   receiving an NFDeregister request for deregistering an NF;
   classifying the NFDeregister request as suspect based on application of suspect NFDeregister request classification rules;
   in response to classifying the NFDeregister request as suspect, queueing the NFDeregister request;
   receiving an NF heart-beat message concerning the NF;
   determining that the NF heart-beat message is received within an NF heart-beat time interval for the NF; and
   in response to determining that the NF heart-beat message is received within the NF heart-beat time interval for the NF, preventing processing of the NF Deregister request and blacklisting a sender of the NFDeregister request.

2. The method of claim 1 wherein classifying the NFDeregister request as suspect based on application of suspect NFDeregister request classification rules includes classifying the NFDeregister request as suspect in response to determining that processing the NFDeregister request would cause a number of available NFs of a same type as the NF to be below a minimum operator-defined threshold.

3. The method of claim 1 wherein classifying the NFDeregister request as suspect based on application of suspect NFDeregister request classification rules includes classifying the NFDeregister request as suspect in response to a rate of NFDeregister requests exceeding an operator-defined threshold.

4. The method of claim 1 wherein classifying the NFDeregister request as suspect based on application of suspect NFDeregister request classification rules includes classifying the NFDeregister request as suspect based on a detected difference between a learned past traffic pattern and a current traffic pattern of which the NFDeregister request is a part.

5. The method of claim 1 wherein classifying the NFDeregister request as suspect based on application of suspect NFDeregister request classification rules includes classifying the NFDeregister request as suspect by default.

6. The method of claim 1 wherein the receiving, classifying, determining, preventing processing, and blacklisting are performed at the NRF and wherein the method further comprises, in response to classifying the NFDeregister request as suspect, transitioning to a SUSPECTED state, and, in the SUSPECTED state, applying operator-defined policies that determine whether to send NFDeregister responses and to respond to NFDiscover requests.

7. The method of claim 1 comprising:
responding to the NFDeregister request with an NFDeregister response; and
inserting, in the NFDeregister response, a suspect timer for instructing the NF to delay shutdown until expiration of the suspect timer.

8. The method of claim 1 wherein the receiving, classifying, determining, preventing processing, and blacklisting are performed at the SCP and wherein preventing processing of the NFDeregister request includes refraining from forwarding the NFDeregister request to the NRF.

9. The method of claim 8 comprising, at the SCP, responding, on behalf of the NRF, to the NFDeregister request with an NFDeregister response.

10. A system for protecting against mass network function (NF) deregistration attacks, the system comprising:
an NF repository function (NRF) or a service communication proxy (SCP) including at least one processor and a memory;
a mass NF deregistration attack mitigation module implemented by the at least one processor for receiving an NFDeregister request for deregistering an NF, classifying the NFDeregister request as suspect based on application of suspect NFDeregister request classification rules, in response to classifying the NFDeregister request as suspect, queueing the NFDeregister request, receiving an NF heart-beat message concerning the NF, determining that the NF heart-beat message is received within an NF heart-beat time interval for the NF, and, in response to determining that the NF heart-beat message is received within the NF heart-beat time interval for the NF, preventing processing of the NF Deregister request and blacklisting a sender of the NFDeregister request.

11. The system of claim of claim 10 wherein the mass NF deregistration attack mitigation module is configured to classify the NFDeregister request as suspect in response to determining that processing the NFDeregister request would cause a number of available NFs of a same type as the NF to be below a minimum operator-defined threshold.

12. The system of claim 10 wherein the mass NF deregistration attack mitigation module is configured to classify the NFDeregister request as suspect in response to a rate of NFDeregister requests exceeding an operator-defined threshold.

13. The system of claim 10 wherein the mass NF deregistration attack mitigation module is configured to classify the NFDeregister request as suspect based on a detected difference between a learned past traffic pattern and a current traffic pattern of which the NFDeregister request is a part.

14. The system of claim 10 wherein the mass NF deregistration attack mitigation module is configured to classify the NFDeregister request as suspect by default.

15. The system of claim 10 wherein the NRF or SCP comprises an NRF, and wherein the mass NF deregistration attack mitigation module is configured to, in response to classifying the NFDeregister request as suspect, transition to a SUSPECTED state, and, in the SUSPECTED state, apply operator-defined policies that determine whether to send NFDeregister responses and to respond to NFDiscover requests.

16. The system of claim 10 wherein the mass NF deregistration attack mitigation module is configured to:
respond to the NFDeregister request with an NFDeregister response; and
insert, in the NFDeregister response, a suspect timer for instructing the NF to delay shutdown until expiration of the suspect timer.

17. The system of claim 10 wherein the NRF or SCP comprises an SCP and wherein the mass NF deregistration attack mitigation module is configured to prevent processing of the NFDeregister request by refraining from forwarding the NFDeregister request to the NRF.

18. The system of claim 17 wherein the mass NF deregistration attack mitigation module is configured to responding, on behalf of the NRF, to the NFDeregister request with an NFDeregister response.

19. A non-transitory computer readable medium having stored thereon executable instructions that when executed by a processor of a computer control the computer to perform steps comprising:
at a network function (NF) repository function (NRF) or a service communication proxy (SCP):
receiving an NFDeregister request for deregistering an NF;
classifying the NFDeregister request as suspect based on application of suspect NFDeregister request classification rules;
in response to classifying the NFDeregister request as suspect, queueing the NFDeregister request;
receiving an NF heart-beat message concerning the NF;
determining that the NF heart-beat message is received within an NF heart-beat time interval for the NF; and
in response to determining that the NF heart-beat message is received within the NF heart-beat time interval for the NF, preventing processing of the NF Deregister request and blacklisting a sender of the NFDeregister request.

* * * * *

UNITED STATES PATENT AND TRADEMARK OFFICE
CERTIFICATE OF CORRECTION

PATENT NO. : 11,638,155 B2
APPLICATION NO. : 17/314329
DATED : April 25, 2023
INVENTOR(S) : Rajput et al.

It is certified that error appears in the above-identified patent and that said Letters Patent is hereby corrected as shown below:

On the Title Page

Column 1, Line 1 References Cited, U.S. Patent Documents:
Replace "1,872,957 A 8/1931"
With --"1,872,957 A 8/1932"--

Page 2, Column 2, Line 48 References Cited, Other Publications:
Replace "for5G"
With --"for 5G"--

Page 4, Column 2, Line 9 References Cited, Other Publications:
Replace "Intiated"
With --"Initiated"--

In the Specification

Column 4, Line 35:
Replace "A"
With --"a"--

Column 12, Line 30:
Replace "ln"
With --"in"--

In the Claims

Column 19, Line 45 Claim 11:
Replace "of claim of claim"
With --"of claim"--

Signed and Sealed this
Thirtieth Day of July, 2024

Katherine Kelly Vidal
*Director of the United States Patent and Trademark Office*